(12) United States Patent
Kamada et al.

(10) Patent No.: US 8,002,890 B2
(45) Date of Patent: Aug. 23, 2011

(54) MORTAR COMPOSITION

(75) Inventors: Isao Kamada, Fukuoka (JP); Takeshi Yano, Fukuoka (JP)

(73) Assignee: Advanced Technology Co., Ltd., Fukuoka-shi (JP)

( * ) Notice: Subject to any disclaimer, the term of this patent is extended or adjusted under 35 U.S.C. 154(b) by 1102 days.

(21) Appl. No.: 11/541,801

(22) Filed: Oct. 3, 2006

(65) Prior Publication Data

US 2007/0084384 A1 Apr. 19, 2007

Related U.S. Application Data

(63) Continuation-in-part of application No. 10/490,211, filed as application No. PCT/JP03/04780 on Apr. 15, 2003, now abandoned.

(30) Foreign Application Priority Data

Oct. 11, 2002 (JP) .......................... PCT/JP02/10623

(51) Int. Cl.
*C04B 7/00* (2006.01)
*C04B 14/00* (2006.01)
*C04B 24/00* (2006.01)

(52) U.S. Cl. ........ 106/737; 106/728; 106/715; 106/717; 106/724; 106/729; 106/730

(58) Field of Classification Search .................. 106/728, 106/715, 717, 724, 729, 730, 737
See application file for complete search history.

(56) References Cited

U.S. PATENT DOCUMENTS

| | | | | |
|---|---|---|---|---|
| 4,883,535 A | * | 11/1989 | Hamaguchi et al. | 524/5 |
| 5,185,039 A | * | 2/1993 | Hamaguchi et al. | 106/728 |
| 5,423,634 A | | 6/1995 | Fujita et al. | |
| 5,681,386 A | * | 10/1997 | Tjugum | 106/819 |
| 5,725,657 A | * | 3/1998 | Darwin et al. | 106/808 |
| 6,176,921 B1 | * | 1/2001 | Kinoshita et al. | 106/809 |
| 6,384,141 B2 | | 5/2002 | Hirata et al. | |
| 6,436,184 B1 | * | 8/2002 | Ceccaldi et al. | 106/715 |
| 2004/0231568 A1 | | 11/2004 | Morioka et al. | |
| 2006/0124034 A1 | * | 6/2006 | Okazawa et al. | 106/823 |

FOREIGN PATENT DOCUMENTS

| | | |
|---|---|---|
| JP | 47-22425 | 10/1972 |
| JP | 54-61228 | 5/1979 |
| JP | 5-9045 | 1/1993 |
| JP | 7-16829 | 1/1995 |
| JP | 10-279343 | 10/1998 |
| JP | 11-116315 | 4/1999 |
| JP | 2000-34156 | 2/2000 |

OTHER PUBLICATIONS

The PCT International Search Report for corresponding international application No. PCT/JP03/04780, dated Jul. 22, 2003.

* cited by examiner

*Primary Examiner* — Elizabeth D Wood

(74) *Attorney, Agent, or Firm* — Edwards Angell Palmer & Dodge LLP

(57) ABSTRACT

A method of preparing a mortar composition, comprising mixing of mortar materials comprising at least 25 to 45 parts by weight of high-early-strength portland cement, 40 to 60 parts by weight of sand, 0.05 to 0.12 parts by weight of polycarboxylic acid-based powdered water reducing agent, and 10 to 25 parts by weight of water, and not comprising any organic adhesives. Mixing of the mortar materials is achieved by agitating the same in an agitator until agitating load rapidly decreases. The mortar composition prepared in accordance with this invention has excellent ability to infiltrate into the surface to be adhered, and high bonding strength after hardening.

16 Claims, 18 Drawing Sheets

*Fig.1*

| Specimen | | 1-1 | 1-2 | 1-3 | 1-4 | 1-5 |
|---|---|---|---|---|---|---|
| Ingredients | HES portland cement | 380 | 380 | 380 | 380 | 380 |
| | PAB water reducing agent | 0 | 0.5 | 1.0 | 1.5 | 3.0 |
| | Silica sand | 600 | 600 | 600 | 600 | 600 |
| | Water | 200 | 200 | 200 | 200 | 200 |
| Total | | 1,180 | 1,181 | 1,181 | 1,182 | 1,183 |
| Mixing ratio | Water/Binder | 0.526 | 0.526 | 0.526 | 0.526 | 0.526 |
| | Water/Powder | 0.204 | 0.204 | 0.204 | 0.204 | 0.204 |
| Physical property value | Flow value  mm | 205 | 240 | 266 | 291 | 307 |
| Workability | Workability | △ | △ | ◎ | ○ | △ |
| Compressive strength ($N/mm^2$) | $\sigma_c$  3rd day | 18.2 | 19.4 | 22.3 | 21.3 | 20.5 |
| | 7th day | 23.7 | 27.2 | 30.9 | 28.3 | 27.3 |
| | 14th day | 29.4 | 31.9 | 35.6 | 34.7 | 31.0 |
| | 28th day | 31.2 | 34.4 | 38.2 | 37.0 | 33.5 |
| Flexural strength ($N/mm^2$) | $\sigma_b$  7th day | 3.2 | 3.3 | 4.4 | 3.4 | 3.2 |
| | 14th day | 3.7 | 3.7 | 4.3 | 3.9 | 3.7 |
| | 28th day | 3.9 | 3.9 | 4.9 | 4.4 | 3.9 |
| Bond strength ($N/mm^2$) | $\sigma_a$  7th day | 1.03 | 1.18 | 1.26 | 1.22 | 1.14 |
| | 14th day | 1.55 | 1.74 | 1.92 | 1.85 | 1.68 |
| | 28th day | 1.82 | 1.95 | 2.28 | 2.18 | 1.99 |

Fig.2

| Specimen | | 2-1 | 2-2 | 2-3 | 2-4 |
|---|---|---|---|---|---|
| Ingredients | HES portland cement | 380 | 380 | 380 | 380 |
| | Anhydrous gypsum | 0 | 5 | 10 | 15 |
| | PAB water reducing agent | 1.0 | 1.0 | 1.0 | 1.0 |
| | Silica sand | 600 | 600 | 600 | 600 |
| | Water | 200 | 200 | 200 | 200 |
| Total | | 1,181 | 1,186 | 1,191 | 1,196 |
| Mixing ratio | Water/Binder | 0.525 | 0.518 | 0.512 | 0.505 |
| | Water/Powder | 0.204 | 0.203 | 0.202 | 0.201 |
| Physical property value | Flow value   mm | 266 | 269 | 263 | 261 |
| Workability | Workability | ○ | ◎ | ○ | △ |
| Compressive strength (N/mm$^2$) | $\sigma_c$   3rd day | 22.3 | 24.9 | 24.6 | 27.4 |
| | 7th day | 30.9 | 33.4 | 30.3 | 27.7 |
| | 14th day | 35.6 | 38.6 | 34.9 | 32.0 |
| | 28th day | 38.2 | 41.4 | 37.5 | 34.3 |
| Flexural strength (N/mm$^2$) | $\sigma_b$   7th day | 4.4 | 4.7 | 4.3 | 3.9 |
| | 14th day | 4.3 | 4.7 | 4.2 | 3.9 |
| | 28th day | 4.9 | 5.3 | 4.8 | 4.4 |
| Bond strength (N/mm$^2$) | $\sigma_a$   7th day | 1.26 | 1.36 | 1.23 | 1.13 |
| | 14th day | 1.92 | 2.08 | 1.88 | 1.72 |
| | 28th day | 2.23 | 2.42 | 2.19 | 2.00 |

Fig.3

| Specimen | | 3-1 | 3-2 | 3-3 | 3-4 | 3-5 |
|---|---|---|---|---|---|---|
| Ingredients | HES portland cement | 380 | 380 | 380 | 380 | 380 |
| | Anhydrous gypsum | 5.0 | 5.0 | 5.0 | 5.0 | 5.0 |
| | PAB water reducing agent | 1.0 | 1.0 | 1.0 | 1.0 | 1.0 |
| | Water retentive agent | 0.0 | 0.5 | 1.0 | 1.5 | 3.0 |
| | Silica sand | 600 | 600 | 600 | 600 | 600 |
| | Water | 200 | 200 | 200 | 200 | 200 |
| Total | | 1,186 | 1,187 | 1,187 | 1,188 | 1,189 |
| Mixing ratio | Water/Binder | 0.518 | 0.517 | 0.517 | 0.516 | 0.514 |
| | Water/Powder | 0.203 | 0.203 | 0.203 | 0.203 | 0.202 |
| Physical property value | Flow value (immediately after mixing) | 268 | 265 | 277 | 246 | 258 |
| | Flow value (one hour after mixing) | 196 | 202 | 217 | 214 | 241 |
| Workability | Workability | △ | △ | ○ | △ | △ |
| Compressive strength (N/mm$^2$) | $\sigma_c$ 3rd day | 24.9 | 26.4 | 27.8 | 25.7 | 22.7 |
| | 7th day | 33.4 | 34.8 | 40.1 | 38.2 | 31.1 |
| | 14th day | 38.6 | 40.2 | 46.2 | 44.1 | 35.9 |
| | 28th day | 41.4 | 43.1 | 49.6 | 47.3 | 38.5 |
| Flexural strength (N/mm$^2$) | $\sigma_b$ 7th day | 4.7 | 4.9 | 5.7 | 5.4 | 4.4 |
| | 14th day | 4.7 | 4.9 | 5.6 | 5.3 | 4.3 |
| | 28th day | 5.3 | 5.5 | 6.3 | 6.0 | 4.9 |
| Bond strength (N/mm$^2$) | $\sigma_a$ 7th day | 1.36 | 1.42 | 1.63 | 1.56 | 1.27 |
| | 14th day | 2.08 | 2.16 | 2.49 | 2.37 | 1.93 |
| | 28th day | 2.42 | 2.52 | 2.90 | 2.76 | 2.25 |

Fig. 4

| Specimen | | 4-1 | 4-2 | 4-3 | 4-4 | 4-5 |
|---|---|---|---|---|---|---|
| Ingredients | HES portland cement | 380 | 380 | 380 | 380 | 380 |
| | Anhydrous gypsum | 5.0 | 5.0 | 5.0 | 5.0 | 5.0 |
| | PAB water reducing agent | 1.0 | 1.0 | 1.0 | 1.0 | 1.0 |
| | Water retentive agent | 1.0 | 1.0 | 1.0 | 1.0 | 1.0 |
| | Carbon-based powder | 0 | 10 | 20 | 40 | 15 |
| | Silica sand | 600 | 600 | 600 | 600 | 600 |
| | Water | 200 | 200 | 200 | 200 | 200 |
| Total | | 1,187 | 1,197 | 1,207 | 1,227 | 1,202 |
| Mixing ratio | Water/Binder | 0.517 | 0.504 | 0.491 | 0.468 | 0.498 |
| | Water/Powder | 0.203 | 0.201 | 0.199 | 0.195 | 0.200 |
| Physical property value | Flow value   mm | 271 | 274 | 259 | 224 | 262 |
| Workability | Workability | ○ | ○ | ○ | ○ | ◎ |
| Compressive strength (N/mm$^2$) | $\sigma_c$   3rd day | 29.9 | 28.3 | 28.4 | 23.2 | 28.4 |
| | 7th day | 38.9 | 36.9 | 37.0 | 30.3 | 37.8 |
| | 14th day | 44.9 | 42.6 | 42.8 | 34.9 | 42.7 |
| | 28th day | 48.2 | 53.0 | 51.1 | 49.8 | 55.0 |
| Flexural strength (N/mm$^2$) | $\sigma_b$   7th day | 4.2 | 4.7 | 4.5 | 4.4 | 4.8 |
| | 14th day | 4.5 | 5.0 | 4.8 | 4.7 | 5.2 |
| | 28th day | 5.4 | 6.0 | 5.8 | 5.6 | 6.3 |
| Bond strength (N/mm$^2$) | $\sigma_a$   7th day | 1.59 | 1.50 | 1.51 | 1.23 | 1.54 |
| | 14th day | 2.40 | 2.28 | 2.29 | 1.87 | 2.33 |
| | 28th day | 2.81 | 2.67 | 2.68 | 2.19 | 2.73 |

Fig.5

| Specimen | | 5-1 | 5-2 | 5-3 | 5-4 |
|---|---|---|---|---|---|
| Ingredients | HES portland cement | 380 | 380 | 380 | 380 |
| | Anhydrous gypsum | 5.0 | 5.0 | 5.0 | 5.0 |
| | PAB water reducing agent | 1.0 | 1.0 | 1.0 | 1.0 |
| | Water retentive agent | 1.0 | 1.0 | 1.0 | 1.0 |
| | Carbon-based powder | 15.0 | 15.0 | 15.0 | 15.0 |
| | Anti-foaming agent | 0.0 | 1.0 | 2.0 | 3.0 |
| | Silica sand | 600 | 600 | 600 | 600 |
| | Water | 200 | 200 | 200 | 200 |
| Total | | 1,202 | 1,203 | 1,204 | 1,205 |
| Mixing ratio | Water/Binder | 0.498 | 0.496 | 0.495 | 0.494 |
| | Water/Powder | 0.200 | 0.199 | 0.199 | 0.199 |
| Physical property value | Flow value mm | 262 | 261 | 255 | 175 |
| Workability | Workability | △ | ○ | ◎ | △ |
| Compressive strength ($N/mm^2$) | $\sigma_c$ 3rd day | 28.4 | 27.7 | 31.2 | 32.4 |
| | 7th day | 37.8 | 40.9 | 41.5 | 39.8 |
| | 14th day | 42.7 | 50.5 | 53.6 | 54.2 |
| | 28th day | 55.0 | 57.4 | 62.6 | 49.3 |
| Flexural strength ($N/mm^2$) | $\sigma_b$ 7th day | 4.8 | 5.2 | 5.3 | 5.1 |
| | 14th day | 5.2 | 6.1 | 6.5 | 6.6 |
| | 28th day | 6.3 | 6.6 | 7.2 | 5.7 |
| Bond strength ($N/mm^2$) | $\sigma_a$ 7th day | 1.54 | 1.67 | 1.69 | 1.62 |
| | 14th day | 2.33 | 2.76 | 2.93 | 2.96 |
| | 28th day | 2.73 | 2.85 | 3.11 | 2.45 |

*Fig.6*

| Specimen | | 6-1 | 6-2 | 6-3 | 6-4 | 6-5 |
|---|---|---|---|---|---|---|
| Ingredients | HES portland cement | 380 | 380 | 380 | 380 | 380 |
| | Anhydrous gypsum | 5.0 | 5.0 | 5.0 | 5.0 | 5.0 |
| | PAB water reducing agent | 1.0 | 1.0 | 1.0 | 1.0 | 1.0 |
| | Water retentive agent | 1.0 | 1.0 | 1.0 | 1.0 | 1.0 |
| | Anti-foaming agent | 2.0 | 2.0 | 2.0 | 2.0 | 2.0 |
| | Carbon-based powder | 15 | 15 | 15 | 15 | 15 |
| | Silica sand | 600 | 600 | 600 | 600 | 600 |
| | Water | 200 | 100 | 150 | 250 | 300 |
| Total | | 1,204 | 1,104 | 1,154 | 1,254 | 1,304 |
| Mixing ratio | Water/Binder | 0.495 | 0.248 | 0.371 | 0.619 | 0.743 |
| | Water/Powder | 0.199 | 0.100 | 0.149 | 0.249 | 0.299 |
| Physical property value | Flow value mm | 255 | 110 | 162 | 320 | 386 |
| | Unit weight g/cm$^3$ | 2.07 | 2.07 | 2.07 | 2.05 | 2.05 |
| Workability | Workability | ◎ | × | ○ | ○ | △ |
| Compressive strength (N/mm$^2$) | $\sigma_c$ 3rd day | 31.2 | 34.9 | 35.4 | 29.4 | 21.3 |
| | 7th day | 41.5 | 45.3 | 44.2 | 39.6 | 26.7 |
| | 14th day | 53.6 | 58.7 | 57.5 | 51.3 | 38.4 |
| | 28th day | 62.6 | 70.4 | 68.3 | 60.2 | 45.1 |
| Flexural strength (N/mm$^2$) | $\sigma_b$ 7th day | 5.3 | 5.8 | 5.8 | 4.6 | 3.2 |
| | 14th day | 6.5 | 7.2 | 7.0 | 5.8 | 4.2 |
| | 28th day | 7.2 | 8.7 | 8.5 | 6.0 | 5.2 |
| Bond strength (N/mm$^2$) | $\sigma_a$ 7th day | 1.69 | 1.78 | 1.83 | 1.60 | 1.03 |
| | 14th day | 2.93 | 2.88 | 3.01 | 2.08 | 1.48 |
| | 28th day | 3.11 | 3.68 | 3.50 | 2.50 | 2.01 |

Fig. 7

| Specimen | | Example 1 | Example 2 | Example 3 |
|---|---|---|---|---|
| Ingredients | HES portland cement | 380 | 380 | 380 |
| | Anhydrous gypsum | 5.0 | 5.0 | 5.0 |
| | PAB water reducing agent | 1.0 | 1.0 | 1.0 |
| | Water retentive agent | 1.0 | 1.0 | 1.0 |
| | Anti-foaming agent | 2.0 | 2.0 | 2.0 |
| | Carbon-based powder | 15 | 15 | 15 |
| | Silica sand | 600 | 600 | 600 |
| | Water | 250 | 200 | 150 |
| Total | | 1,254 | 1,204 | 1,154 |
| Mixing ratio | Water/Binder | 0.619 | 0.495 | 0.371 |
| | Water/Powder | 0.249 | 0.199 | 0.149 |
| Physical property value | Flow value mm | 320 | 255 | 162 |
| | Unit weight g/cm$^3$ | 2.05 | 2.07 | 2.07 |
| Compressive strength (N/mm$^2$) | $\sigma_c$ 1st day | 6.3 | 8.5 | 12.5 |
| | 3rd day | 29.4 | 31.2 | 35.4 |
| | 7th day | 39.6 | 41.5 | 44.2 |
| | 14th day | 51.3 | 53.6 | 57.5 |
| | 28th day | 60.2 | 62.6 | 68.3 |
| Flexural strength (N/mm$^2$) | $\sigma_b$ 3rd day | 3.8 | 4.5 | 5.1 |
| | 7th day | 4.6 | 5.3 | 5.8 |
| | 14th day | 5.8 | 6.5 | 7.0 |
| | 28th day | 6.0 | 7.2 | 8.5 |
| Bond strength (N/mm$^2$) | $\sigma_a$ 3rd day | 0.77 | 0.99 | 1.20 |
| | 7th day | 1.60 | 1.69 | 1.83 |
| | 14th day | 2.08 | 2.93 | 3.01 |
| | 28th day | 2.50 | 3.11 | 3.50 |
| Maximum distortion degree | $\mu$ 28th day | 5067 | 5258 | 5417 |
| Overall evaluation | | ◎ | ◎ | ◎ |

Fig.8

| Specimen | | Comparative Example 1 | Comparative Example 2 | Comparative Example 3 |
|---|---|---|---|---|
| Ingredients | Ordinary portland cement | 300 | 300 | 300 |
| | Silica sand | 900 | 600 | 900 |
| | Resin | 0 | 0 | 60 |
| | Water | 180 | 180 | 90 |
| Total | | 1,380 | 1,080 | 1,350 |
| Compressive strength | 28th day  N/mm$^2$ | 24.0 | 32.0 | 36.0 |
| Flexural strength | 28th day  N/mm$^2$ | 3.9 | 5.2 | 6.0 |
| Bond strength | 28th day  N/mm$^2$ | 0.3 | 0.4 | 1.1 |

Fig.9

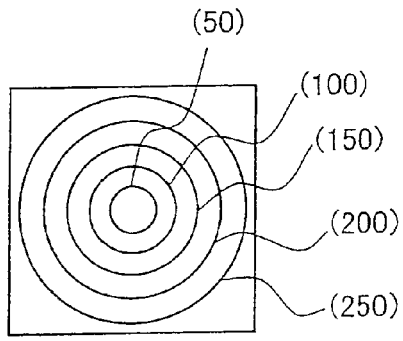

(a) Steel base plate for measuring flow

| Ultimate distance (mm) | Time required (sec) | Remarks |
|---|---|---|
| Just behind | 0 | • Method for preparing specimen: Mix for 6 minutes with a propeller blade.<br>• Rapid decrease in agitating load: Confirmed |
| 100 | 1.6 | |
| 150 | 7.8 | |
| 200 | 19.2 | |
| 250 | 52.3 | |

(a) In case where agitation was sufficiently carried out

| Ultimate distance (mm) | Time required (sec) | Remarks |
|---|---|---|
| Just behind | 0 | • Method for preparing specimen: Mix for 3 minutes with a grout blade.<br>• Rapid decrease in agitating load: Not confirmed |
| 100 | 5.5 | |
| 150 | 14.5 | |
| 200 | 42.2 | |
| 250 | 104.8 | |

(b) In case where agitation was not sufficiently carried out

Fig. 16

| | | Present Invention M(A) | M(−) | M(B) | M(C) | M(D) | M(E) | M(F) | M(G) | M(H) |
|---|---|---|---|---|---|---|---|---|---|---|
| Ingredients | Cement | 380 | 380 | 380 | 380 | 380 | 380 | 380 | 380 | 380 |
| | water reducing agent | ○ | × | ○ | ○ | ○ | ○ | ○ | ○ | ○ |
| | contents of water reducing agent | A | | B | C | D | E | F | G | H |
| | Sand | 600 | 600 | 600 | 600 | 600 | 600 | 600 | 600 | 600 |
| | Water | 200 | 200 | 200 | 200 | 200 | 200 | 200 | 200 | 200 |
| | Total | 1,180 | 1,180 | 1,180 | 1,180 | 1,180 | 1,180 | 1,180 | 1,180 | 1,180 |
| Mixing ratio | Water/Binder | 0.562 | 0.562 | 0.562 | 0.562 | 0.562 | 0.562 | 0.562 | 0.562 | 0.562 |
| | Water/Powder | 0.204 | 0.204 | 0.204 | 0.204 | 0.204 | 0.204 | 0.204 | 0.204 | 0.204 |
| Physical property value | Flow value mm | 266 | 203 | 237 | 283 | 300 | 240 | 254 | 277 | 285 |
| workability | Viscosity | ◎ | ▲ | △ | ○ | ▲ | △ | ○ | △ | △ |

Fig.17

| mortar Time(min) | Present Invention M(A) | M(—) | M(B) | M(C) | M(D) | M(E) | M(F) | M(G) | M(H) |
|---|---|---|---|---|---|---|---|---|---|
| 0.0 | 2.20 | 2.20 | 2.20 | 2.20 | 2.20 | 2.20 | 2.20 | 2.20 | 2.20 |
| 0.5 | 4.12 | 3.40 | 3.45 | 2.96 | 2.75 | 3.42 | 3.24 | 3.17 | 2.84 |
| 1.0 | 3.85 | 3.65 | 3.50 | 3.20 | 2.75 | 3.45 | 3.28 | 3.06 | 2.91 |
| 1.5 | 3.60 | 3.80 | 3.55 | 3.25 | 2.63 | 3.30 | 3.24 | 3.06 | 2.84 |
| 2.0 | 3.55 | 3.85 | 3.55 | 2.96 | 2.61 | 3.30 | 3.24 | 3.06 | 2.84 |
| 2.5 | 3.50 | 3.78 | 3.50 | 2.86 | 2.60 | 3.30 | 3.22 | 3.06 | 2.78 |
| 3.0 | 3.45 | 3.75 | 3.45 | 2.86 | 2.60 | 3.26 | 3.22 | 3.02 | 2.78 |
| 3.5 | 3.40 | 3.70 | 3.40 | 2.86 | 2.60 | 3.26 | 3.22 | 3.02 | 2.78 |
| 4.0 | 3.25 | 3.70 | 3.37 | 2.86 | 2.60 | 3.26 | 3.22 | 3.00 | 2.78 |
| 4.5 | 3.10 | 3.70 | 3.37 | 2.86 | 2.60 | 3.26 | 3.20 | 3.00 | 2.78 |
| 5.0 | 3.08 | 3.70 | 3.35 | 2.86 | 2.59 | 3.24 | 3.20 | 3.00 | 2.78 |
| 5.5 | 3.08 | 3.70 | 3.35 | 2.86 | 2.59 | 3.22 | 3.20 | 3.00 | 2.78 |
| 6.0 | 3.08 | 3.71 | 3.35 | 2.86 | 2.59 | 3.22 | 3.19 | 2.98 | 2.78 |
| 6.5 | 3.08 | 3.71 | 3.33 | 2.86 | 2.59 | 3.21 | 3.19 | 2.98 | 2.78 |
| 7.0 | 3.06 | 3.71 | 3.33 | 2.86 | 2.59 | 3.21 | 3.18 | 2.98 | 2.78 |
| 7.5 | 3.04 | 3.71 | 3.33 | 2.86 | 2.59 | 3.21 | 3.18 | 2.98 | 2.78 |
| 8.0 | 3.04 | 3.71 | 3.33 | 2.86 | 2.59 | 3.21 | 3.18 | 2.98 | 2.78 |
| 8.5 | 3.03 | 3.72 | 3.33 | 2.86 | 2.59 | 3.21 | 3.18 | 2.97 | 2.77 |
| 9.0 | 3.02 | 3.72 | 3.33 | 2.86 | 2.59 | 3.21 | 3.18 | 2.97 | 2.77 |
| 9.5 | 3.02 | 3.72 | 3.33 | 2.86 | 2.59 | 3.21 | 3.18 | 2.97 | 2.77 |
| 10.0 | 3.02 | 3.73 | 3.33 | 2.86 | 2.59 | 3.21 | 3.18 | 2.97 | 2.77 |
| 3rdTD/TI (%) | 15.63 | - | - | - | - | - | - | - | - |
| PV(PT) | 4.12(0.5) | 3.85(2.0) | 3.55(1.5) | 3.25(1.5) | 2.75(0.5) | 3.45(1.0) | 3.28(1.0) | 3.17(0.5) | 2.91(1.0) |
| (PV-10minV)/TI(%) | 57.29 | 7.27 | 16.30 | 37.14 | 29.09 | 19.20 | 9.26 | 20.62 | 19.72 |

MORTAR COMPOSITION

This application is a Continuation-In-Part application of application Ser. No. 10/490,211 filed on Sep. 21, 2004 now abandoned, which is a national stage entry of PCT/JP03/04780, filed Apr. 15, 2003, which is incorporated herein by reference.

TECHNICAL FIELD

This invention relates to a mortar composition suitably used as a joint material and a finish material for concrete surface, and further, as an adhesive and a surface covering material to be used as reinforcement, and in particular, to an inorganic mortar composition having a high bonding strength and a high strain level.

BACKGROUND ART

Cement mortar and resin mortar are known as mortar compositions used for applications such as joint materials and finish materials for concrete surfaces. A cement mortar is a mixture obtained by adding an aggregate and water to cement, such as portland cement or blended cement, and mixing the same and is used mainly in spraying the surface of a slope of cut or fill, or as a concrete adjusting material. Of such cement mortar, commonly used types are 1:2 mortar whose cement to aggregate ratio is 1 to 2, and 1:3 mortar whose cement to aggregate ratio is 1 to 3.

On the other hand, resin mortar is a mixture obtained by mixing resin (organic adhesive), such as styrene-butadiene rubber latex (SBR), ethylene-vinyl acetate (EVA) or polyacrylic ester (PAB) emulsion, into the above described cement mortar. As a result of mixing resin into the cement mortar, the resin mortar has improved properties in bonding strength, flexural strength and resistance to acids. Therefore, it is suitably used in sealing decoration materials or repairing floor, wall and the like.

However, a bonding strength of a cement mortar is generally as low as 0.3 N/mm$^2$ to 0.5 N/mm$^2$. The strength is far lower than the value 2.0 N/mm$^2$, which is considered to be preferable from the viewpoint of seismic safety, and does not even reach the value 1.2 N/mm$^2$, which is considered as a measure of daily safety. Moreover, it is susceptible to expansion/contraction because of its high water absorption properties, and repeated expansion/contraction results in its deterioration, causing peeling or cracking.

On the other hand, bonding strength is increased with regards to resin mortar as a result of mixing resin to cement mortar. However, since the properties of a resin itself remains, deterioration due to the environmental factors, such as ultraviolet rays and rainwater, is significant. Accordingly, if a larger amount of resin is used for resin mortar to obtain satisfactory bonding strength, the resin mortar deteriorates more significantly due to the environmental factors, resulting in poor durability, and cannot be used for practical applications. Moreover, since resin itself is combustible, resin mortar is not suitable to be used in places where it may cause a fire. In addition, it raises many problems, such as causing rashes when the resin attaches to a person's skin, and environmental pollution due to the volatilization of organic solvent.

As recent prior arts, Japanese Patent Laid-Open No. 11-092205 discloses a mortar composition combining high compressive strength and low static modulus of elasticity, and Japanese Patent Laid-Open No. 2000-072518 discloses spraying cement having high flowing properties.

However, the present condition is that no invention has been made yet which relates to a mortar composition meeting all the requirements of high bonding strength, high compressive strength, high strain level and high flexural strength, and capable of being provided at low cost.

This invention has been made in light of the above described problems, and accordingly, an object of this invention is to provide a mortar composition having sufficiently high bonding strength to fulfill the standard of seismic safety, and also having high strain level.

Another object of this invention is to provide a mortar composition having high compressive strength, high flexural strength and high follower properties, and in addition, not being susceptible to cracks.

Another object of this invention is to provide a mortar composition not susceptible to expansion/contraction, and has limited changes with time (deterioration due to elapsing time).

Still another object of this invention is to provide a mortar composition considering the safety of operation by using no organic adhesives, and the use of other organic materials and volatile solvents is avoided as much as possible.

Another object of this invention is to provide a mortar composition which allows low material costs and high workability.

The other objects, features and advantages of the invention will be better understood by those skilled in the art from the following description.

DISCLOSURE OF THE INVENTION

In order to provide a mortar composition capable of developing required bonding strength after execution of work without using any organic adhesives, and at flow cost, the inventors of this invention directed their attention to a combination of portland cement and a high-range AE (air entraining) water reducing agent and tried to develop required bonding strength through what is known as "Anchoring effect" by uniformly dispersing cement particles in the mortar composition so as to allow the cement particles and cement gel be easily infiltrated into fine grooves and gaps of the object to which the cement is to be adhered. As is well known to those skilled in the art, since electrostatic repulsion acts among cement particles which have been negatively charged by a high-range air entraining water reducing agent, the cement particles are uniformly dispersed within a mortar composition.

The high-range air entraining water reducing agents are commonly classified into four categories: naphthalene-based agents, melamine-based agents, aminosulfone agents and polycarboxylic acid-based agents. It is known that, of these high-range air entraining water reducing agents, polycarboxylic acid-based agents have dispersibility and dispersion-keeping ability superior to naphthalene-based agents since their dispersion mechanism has bulkier adsorption form than the naphthalene-based agents, and hence stronger electrostatic repulsion among particles and steric hindrance. Therefore, by viewing the dispersion of cement particles alone, polycarboxylic acid-based water reducing agent is most preferably used as a high-range air entraining water reducing agent.

Known types of portland cement includes, for example, ordinary portland cement, high-early-strength portland cement and ultra high-early-strength portland cement. With regards to the ease of acquisition as well as cost, ordinary portland cement is preferred. However, if a polycarboxylic acid-based water reducing agent is mixed in cement mortar where ordinary portland cement has been used as cement, the initial stage strength does not reach a sufficient value since polycarboxylic acid-based water reducing agents have strong hardening retardation effect, which hinders the workability. This has been well known as one of the disadvantages of polycarboxylic acid-based water reducing agents, and is the reason why other types of water reducing agents, such as naphthalene-based water reducing agents, are often used.

However, after directing intensive research toward this study, the inventors of this invention have made a finding that in cement mortar using high-early-strength portland cement as the cement, even if a polycarboxylic acid-based water reducing agent is mixed in the cement mortar, it can develop practically sufficient initial stage strength, while keeping the effect of uniformly dispersing cement particles and satisfying required bonding strength, and does not hinder the workability. In cement mortar using ultra high-early-strength portland cement, though the same initial stage strength development is expected, it is significantly difficult to employ due to high cement procuring costs.

The inventors of this invention have ascertained, through repeated trial and error, that some polycarboxylic acid-based water reducing agents provide neither the required initial stage strength nor the bonding strength even if they are used in combination with high-early-strength portland cement. According to the intensive research by the inventors, it is presumed that polycarboxylic acid-based water reducing agents providing satisfactory initial stage strength and bonding strength are characterized by their molecular structure, having short backbone chains and long graft chains ($-CH_2 CH_2 2O-$). In other words, a long graft chain provides high cement particle dispersing ability, and a short backbone chain promotes hydration reaction and enhance the strength, since cement particles are easily brought into contact with water. Up to the present time, the principle has not been fully clarified. However, polycarboxylic acid-based water reducing agents suitably used in this invention must be such that they provide certain initial stage strength when they are used in combination with high-early-strength portland cement. Conversely with the presence or absence of the initial stage strength, the suitability of polycarboxylic acid-based water reducing agents can be determined.

When polycarboxylic acid-based water reducing agents are in a powder form, ease of handling sales can be improved by preparing powdered mortar material mixture in advance, by mixing cement, sand, and water reducing agent, and then placing the mixture in a sack to be sold individually. Furthermore, a desired mortar composition can be prepared immediately at the job site only by mixing the mixture with water.

Since the polycarboxylic acid-based water reducing agent is in a powder form, a special care must be taken to achieve sufficient mixing of the powdered mortar material mixture. As a result of an intensive research, the inventors of this invention have made a finding that, when using an electric agitator, preferably the shape of the agitating blade or agitating element is such that it allows the mortar material mixture to be subjected to sufficient mixing pressure according to the movement of the agitating blade or agitating element.

The confirmation of the mortar material mixture being uniformly mixed varies depending on the shape or revolving form of the agitating blade, and cannot be specified in an unconditional manner. However, the inventors have found that it can be ascertained generally, by a rapid decrease in agitating load. The rapid decrease in agitating load can be ascertained, when using a hand agitator, by the counteraction of agitating pressure transmitted to the user's hand. In an electric agitator fixed to a container, the rapid decrease in agitating load can be easily ascertained by visually observing the load current or speed of revolution of the mixing electric motor. In addition, whether the mortar material mixture is uniformly mixed or not can also be determined by the flow speed of a mortar composition. After intensive research, the inventors of this invention have made a finding that, while there is not a great difference in a flow value between a sufficiently mixed mortar composition and a mortar composition that has not been sufficiently mixed, with regards to a flow speed (time required for a mortar composition to flow a certain distance), a difference as much as twice in flow speed arises. Accordingly, whether a mortar material mixture is uniformly mixed or not can also be determined by the difference in flow speed.

The invention described so far can be understood as (1) a method of preparing a mortar composition, (2) a mortar composition itself, (3) a powdered mortar material mixture to be used in preparation of a mortar composition, and (4) a method of preparing a mortar composition using a powdered mortar material mixture.

Specifically, a method of preparing a mortar composition in accordance with this invention is to mix mortar materials not including any organic adhesives, and including at least 25 to 45 parts by weight of high-early-strength portland cement, 40 to 60 parts by weight of sand, 0.05 to 0.12 parts by weight of a powdered polycarboxylic acid-based water reducing agent, and 10 to 25 parts by weight of water. If the amount of powdered polycarboxylic acid-based water reducing agent is less than 0.05 parts by weight, cement particles may not fully disperse. On the other hand, if the amount is more than 0.12 parts by weight, the powdered polycarboxylic acid-based water reducing agent develops its hardening retardation effect, thereby initial stage strength may not fully increase and the workability may be hindered.

Mixing of the mortar materials is achieved by agitating the same in an agitator at least until the agitating load rapidly decreases. The mortar composition thus prepared has excellent physical properties such as, bonding strength of 2.5 N/mm$^2$ or more on 28th day after execution of work in accordance with JIS A 6916, strain level of 5000μ or more on 28th day after execution of work in accordance with JIS A 1149, compressive strength of 60.0 N/mm$^2$ or more on 28th day after execution of work in accordance with JIS R 5201, and flexural strength of 6.0 N/mm$^2$ or more on 28th day after execution of work in accordance with JIS R 5201, since cement particles are uniformly dispersed in water.

A mortar composition in accordance with this invention is prepared by mixing mortar materials not including any organic adhesives, and including at least 25 to 45 parts by weight of high-early-strength portland cement, 40 to 60 parts by weight of sand, 0.05 to 0.12 parts by weight of a powdered polycarboxylic acid-based water reducing agent, and 10 to 25 parts by weight of water. Mixing of the mortar materials is achieved by agitating the same in an agitator at least until the agitating load rapidly decreases. The mortar composition thus prepared has excellent physical properties such as, bonding strength of 2.5 N/mm$^2$ or more on 28th day after execution of work in accordance with JIS A 6916, strain level of 5000μ or more on 28th day after execution of work in accordance with JIS A 1149, compressive strength of 60.0 N/mm$^2$ or more on 28th day after execution of work in accordance with JIS R 5201, and flexural strength of 6.0 N/mm$^2$ or more on 28th day after execution of work in accordance with JIS R 5201, since cement particles are uniformly dispersed in water.

A powdered mortar material mixture for use in preparation of a mortar composition in accordance with this invention is a mixture of powders not including organic adhesives, and including at least 25 to 45 parts by weight of high-earlystrength portland cement, 40 to 60 parts by weight of sand, and 0.05 to 0.12 parts by weight of a powdered polycarboxylic acid-based water reducing agent. A mortar composition is prepared by infusing 10 to 25 parts by weight of water into the mixed powder, and then by agitating the mixture until the agitating load rapidly decreases. The resultant mortar composition has excellent physical properties such as, bonding strength of 2.5 N/mm$^2$ or more on 28 the day after execution of work in accordance with JIS A 6916, strain level of 5000μ or more on 28th day after execution of work in accordance with JIS A 1149, compressive strength of 60.0 N/mm$^2$ or more on 28th day after execution of work in accordance with JIS R 5201, and flexural strength of 6.0 N/mm$^2$ or more on 28th day after execution of work in accordance with JIS R 5201, since cement particles are uniformly dispersed in water.

A method of preparing a mortar composition using the powdered mortar material mixture in accordance with this invention includes the steps of, infusing 10 to 25 parts by weight of water into a powdered mortar material mixture not including organic adhesives, and including 25 to 45 parts by weight of high-early-strength portland cement, 40 to 60 parts by weight of sand, and 0.05 to 0.12 parts by weight of a powdered polycarboxylic acid-based water reducing agent, then mixing the mixture. Mixing of the mortar materials is achieved by agitating the same in an agitator at least until the agitating load rapidly decreases. The mortar composition thus prepared has excellent physical properties such as bonding strength of 2.5 N/mm$^2$ or more on 28th day after execution of work in accordance with JIS A 6916, strain level of 5000μ or more on 28th day after execution of work in accordance with JIS A 1149, compressive strength of 60.0 N/mm$^2$ or more on 28th day after execution of work in accordance with JIS R 5201, and flexural strength of 6.0 N/mm$^2$ or move on 28th day after execution of work in accordance with JIS R 5201, since cement particles are uniformly dispersed in water.

The term "bonding strength" used herein, is a strength of attachment measured when a mortar composition attaches to an object with only one surface in contact with the object. For the bonding strength of cement or mortar, 1.2 N/mm$^2$ or more (measured on 28th day) is considered to be desirable from the viewpoint of daily safety, and 2.0 N/mm$^2$ or more (measured on 28th day) is considered to be desirable from the viewpoint of seismic safety.

The term "strain level" used herein, is a coefficient that represents the amount of contraction and expansion of a cylindrical test specimen caused when compressive load is applied to the test specimen. Larger the value of strain level, the amount of contraction and expansion becomes large, and hence, has higher followability. Conversely, smaller the value of strain level, the amount of contraction and expansion becomes small, and hence, has lower followability.

The mortar composition obtained in accordance with this invention combines sufficient bonding strength and high followability from the viewpoint of seismic safety. Accordingly, after hardening, a mortar composition of the present invention does no peel off from a surface easily, and is capable of withstanding contraction and expansion of the surface. Therefore, it is suitable to be used as a repairing material, or a covering material for reinforcing the surface of steel poles, or the like.

In addition, the mortar composition obtained in accordance with this invention has high resistance to a force applied perpendicularly to a surface of the construction, to which the composition has been applied, since the compressive strength after hardening is sufficiently high. Therefore, the composition is less susceptible to damages and cracks. Furthermore, since the flexural strength is sufficiently high, the composition also has high resistance to a force applied horizontally (in bending direction) to the surface of the construction, and thus becomes less susceptible to damages and cracks.

Regarding the polycarboxylic acid-based water reducing agents, there exists a compatibility issue with the high-early-strength portland cement. However, a polycarboxylic acid-based water reducing agent can be ascertained as having a good compatibility with high-early-strength portland cement if the compressive strength of the prepared mortar composition, having mixing ingredients of only high-early-strength portland cement, a polycarboxylic acid-based water reducing agent, silica sand and water (refer to FIG. 1), is 18.0 N/mm$^2$ or more on 3rd day after execution of work.

Preferably a mortar composition or a powdered mortar material mixture of this invention includes 0.05 to 1.0 parts by weight of a water retentive agent (thickening agent). By including a water retentive agent, the resultant mortar can be provided with higher water retentivity and infiltrating ability. In cement or mortar, a rapid evaporation of water causes a dry out, preventing the cement or mortar from developing bonding strength. Therefore, an additive having water retentivity is used to allow strong bond to an object. The water retentive agents also play a role in protecting cement or mortar against external factors preventing the development of bonding strength at the time of bonding strength being developed (initial stage), and allow a normal development of bonding strength. Preferably the water retentive agent is methylcellulose. Use of methylcellulose as a water retentive agent provides higher water retentivity and infiltrating ability, thereby contributing to the improvement in workability and bonding strength.

Preferably the mortar composition or a powdered mortar material mixture in accordance with this invention includes 0.5 to 2.0 parts by weight of carbon-based powder. By including 0.5 to 2.0 parts by weight of carbon-based powder, the surface hardness is enhanced and the hydration of cement is accelerated.

Preferably the mortar composition or a powdered mortar material mixture in accordance with this invention includes 0.1 to 0.3 parts by weight of an anti-foaming agent. Since binders (materials other than sand and water) constitute a large proportion of the mortar composition in accordance with this invention so as to improve the mortar strength, air bubbles tend to remain in the mortar. However, if mortar materials include 0.1 to 0.3 parts by weight of an anti-foaming agent, the amount of air bubbles become adequate, and contributes to improvement in workability and strength.

Preferably the mortar composition or powdered mortar material mixture in accordance with this invention includes 0.2 to 1.0 parts by weight of gypsum. By including 0.2 to 1.0 parts by weight of gypsum, cracks can be prevented from occurring when cement is hardened and contracted, due to the expansion property of the gypsum. The inclusion of gypsum also contributes to the improvement in initial stage bonding strength, compressive strength and flexural strength.

An application of this invention makes it possible to realize a method of preparing a functional mortar composition. The method includes a step of preparing a powdered mortar material mixture not including any organic adhesives and including 25 to 45 parts by weight of high-early-strength portland cement, 40 to 60 parts by weight of sand, and 0.05 to 0.12 parts by weight of polycarboxylic acid-based water reducing agent, and a step of adding 10 to 25 parts by weight of water, along with functional powder, particles or liquid to the powdered mortar material mixture and agitating the mixture until when the agitating load rapidly decreases. As the functional powder, simply silica sand may be used, or any functional powder, such as metal powder or rubber powder may be introduced to realize mortar compositions having various functional properties.

BRIEF DESCRIPTION OF THE DRAWINGS

FIG. 1 is a table representing a relationship between the amount of water reducing agent added to a mortar composition of the invention and the physical properties of the same;

FIG. 2 is a table representing a relationship between the amount of gypsum added to a mortar composition of the invention and the physical properties of the same;

FIG. 3 is a table representing a relationship between the amount of water retentive agent added to a mortar composition of the invention and the physical properties of the same;

FIG. 4 is a table representing a relationship between the amount of carbon-based powder added to a mortar composition of the invention and the physical properties of the same;

FIG. 5 is a table representing a relationship between the amount of anti-foaming agent added to a mortar composition of the invention and the physical properties of the same;

FIG. 6 is a table representing a relationship between the amount of water poured over a mortar composition of the invention and the physical properties of the same;

FIG. 7 is a tablular representation of examples of mortar compositions in accordance with the invention;

FIG. 8 is a table representing comparative examples of mortar compositions to mortar compositions in accordance with the invention;

FIG. 9 illustrates a relationship between the degree of agitating a mortar composition and the flow state of the mortar composition;

FIG. 16 is a table showing the composition of nine sample mortar compositions, including the composition of the present invention;

FIG. 17 is a table showing electric current load values of the agitating device made at half minute time intervals for each of the nine sample mortar compositions.

BEST MODE FOR CARRYING OUT THE INVENTION

Figure 10:
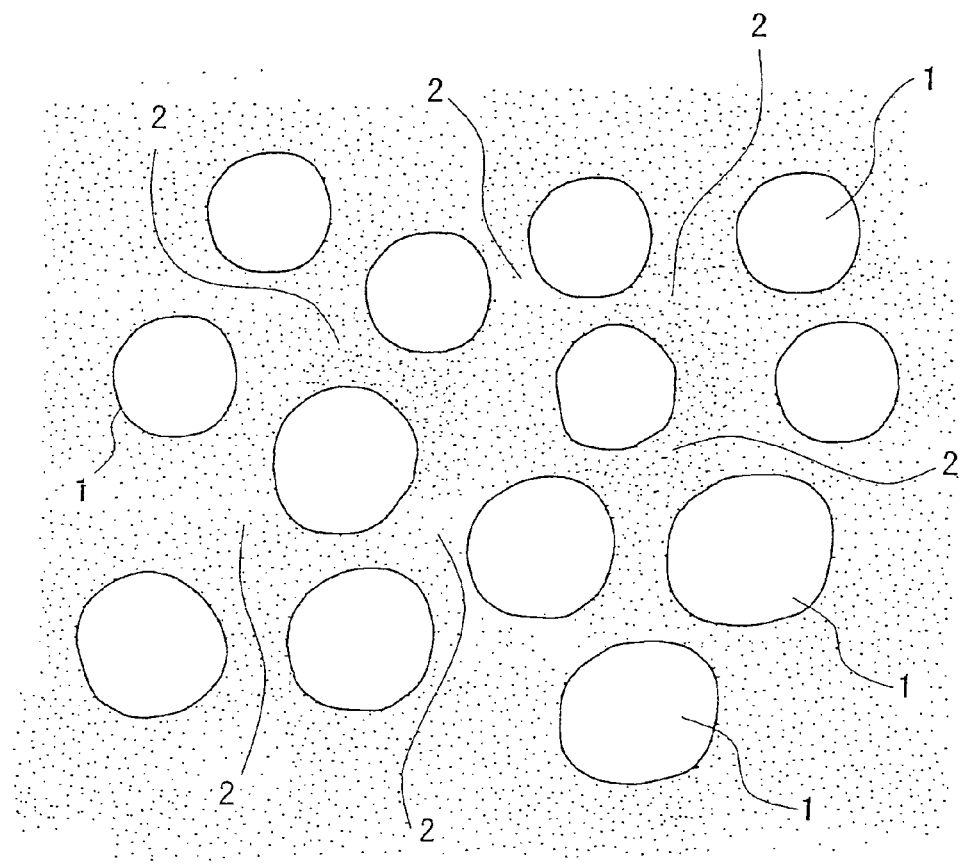
FIG. 10 is a view showing a state in which cement particles are uniformly dispersed.

In the following, a preferred embodiment of the present invention will be described in detail. However, it should be understood that the embodiment is not intended to limit the invention.

A method of preparing a mortar composition in accordance with this embodiment is to prepare a mortar composition by infusing 10 to 25 parts by weight of water into a powdered mortar material mixture prepared in advance, and mixing the mixture and water in a predetermined agitating form The powdered mortar material mixture includes at least 25 to 45 parts by weight of high-early-strength portland cement, 40 to 60 parts by weight of sand, and 0.05 to 0.12 parts by weight of polycarboxylic acid-based powdered water reducing agent. However, it does not include any organic adhesives that may produce various adverse effects. The powdered mortar material mixture further includes 0.05 to 1.0 parts by weight of methylcellulose as a water retentive agent, 0.5 to 2.0 parts by weight of carbon-based powder, 0.1 to 0.3 parts by weight of an anti-foaming agent, and 0.2 to 1.0 parts by weight of gypsum.

Mixing of the powdered mortar material mixture is achieved by agitating the mortar materials in an electric agitator. As an electric agitator, a commonly used mixing apparatus such as a hand-mixer or an agitating device equipped with a container may be used. As an agitating device equipped with a container, for example, an agitating device equipped with a container disclosed in Japanese Utility Model Laid-Open No. 3023035 may be used. The agitating time varies depending on various conditions such as the amount of water used, temperature and humidity. However, when using a hand-mixer, the mortar materials are agitated at 500 to 750 rpm for approximately 5 to 7 minutes.

To allow the mortar composition of this invention to act effectively, it goes without saying that the materials must be mixed as uniformly as possible. After an intensive research, the inventors of this invention have made a finding that the materials can be ascertained as being uniformly mixed by a rapid decrease in agitating load in the agitator. Furthermore, the inventors have made another finding by experience that in conventional mortar compositions a phenomenon of agitating load rapidly decreasing cannot be observed even when the materials have been uniformly mixed. When using a hand-mixer, rapid decrease in agitating load can be confirmed by the magnitude of the agitating counteraction transmitted to a hand operating the mixer. When using an agitating device equipped with a container, rapid decrease in agitating load can be confirmed by the rapid decrease in load current of the electric motor or the increase in number of revolution of the agitating blade.

Further, whether the materials have been uniformly mixed or not can also be determined by the flow speed of the mortar composition. After intensive research, the inventors of this invention have made a finding that not a great difference has been observed in flow values between the fully mixed mortar composition and the mortar composition that have not been fully mixed, but with regard to the flow speed (time required for a mortar composition to flow a certain distance), a difference as much as twice in flow speed arises. Accordingly, whether mortar materials are uniformly mixed or not can also be determined by the difference in flow speed.

The mortar composition thus prepared exhibits excellent physical properties such as bonding strength of 2.5 N/mm$^2$ or more, measured on 28th day after the execution of work in accordance with JIS A 6916, strain level of 5000μ or more, measured on 28th day after execution of work in accordance with JIS A 1149, compressive strength of 60.0 N/mm$^2$ or more, measured on 28th day after execution of work in accordance with JIS R 5201, and flexural strength of 6.0 N/mm$^2$ or more, measured on 28th day after execution of work in accordance with JIS R 5201.

Further, if the compressive strength, measured on 3rd day after execution of work, is not 18.0 N/mm$^2$ or more in a mortar composition where high-early-strength portland cement, a polycarboxylic acid-based water reducing agent, silica sand and water alone are mixed (refer to FIG. 1), the brand of polycarboxylic acid-based powdered water reducing agent used is determined to be poorly compatible. In such case, the polycarboxylic acid-based powdered water reducing agent needs to be replaced by other brand. According to the intensive research by the inventors, it is presumed that an optimum polycarboxylic acid-based powdered water reducing agent has a molecular structure where a backbone chain is short and a graft chain is long.

The mortar composition thus obtained has a particular operation and effect of having higher bonding strength after hardening, shorter hardening time and higher initial stage strength compared with conventional mortar compositions.

The term "bonding strength" used herein, is a strength of attachment measured when a mortar composition attaches to an object with only one surface in contact with the object. For the bonding strength of cement or mortar, $1.2 \text{ N/mm}^2$ or more is considered to be desirable from the viewpoint of daily safety and $2.0 \text{ N/mm}^2$ or more from the viewpoint or seismic safety. The values of the bonding strength are those measured on 28th day after execution of work in accordance with JIS A 6916. Hereinafter, the values of various types of strength indicate the strength measured on 28th day after execution of work, unless otherwise specified.

The inventors of this invention presume that in this invention, cement gel is infiltrated and packed into fine grooves and depressions of a concrete surface and the infiltrated and packed cement gel hardens and expands in such grooves and depressions, thereby producing an anchor-like effect. The improvement in infiltrating ability of cement gel and in strength of anchor-like portions contributes to the improvement in bonding strength.

When intending to enhance the bonding strength alone, resin mortar that contains an increased amount of resin can be used. However, increasing the amount of resin in mortar causes other problems such as durability, working safety and higher cost. Thus, in this invention, the materials used and agitating time of the materials were determined while ensuring the bonding strength of $2.0 \text{ N/mm}^2$ or more to satisfy the seismic safety, and taking into consideration a balance of the bonding strength and the other requirements such as high strain level, high compressive strength, high flexural strength, improvement in durability and low cost.

Further, it is more preferable if the bonding strength of $2.5 \text{ N/mm}^2$ or more can be obtained while ensuring preferable values of the other physical properties. These strength values are those measured on 28th day after execution of work in accordance with JIS A 6916.

The term "strain level" used herein, is a coefficient that represents the amount of contraction and expansion of a cylindrical test specimen caused when compressive load is applied to the test specimen. Larger the value of strain level, the amount of contraction and expansion becomes large, and hence has higher followability. Conversely, smaller the value of strain level, the amount of contraction and expansion becomes small, and hence has lower followability. When same magnitude of force is applied to a material having a high strain level, and a material having a low strain level, the material having high strain level shows more deformation. Since the mortar composition in accordance with this invention has higher strain level compared with conventional cement mortar, when it is subjected to pressure, its deformation is large and its extensibility (followability) is high. In this invention, strain level of $5000\mu$ or more is ensured. These values are measured on 28th day after execution of work in accordance with JIS A 1149.

The term "compressive strength" used herein, is a resistance of a material when it is subjected to compressive stress, and the term "flexural strength" used herein is a resistance of a material when it is subjected to bending stress. If a material has high flexural strength, the material is less susceptible to cracking even when bent. Accordingly, a material having high compressive strength and high strain level is less susceptible to fracture, even when subjected to a large force, and less susceptible to cracks even when bent In this invention, compressive strength of $60.0 \text{ N/mm}^2$ or more and flexural strength of $6.0 \text{ N/mm}^2$ are ensured. These values are measured on 28th day after execution of work in accordance with JIS R 5201.

EXAMPLES

In the following, several examples will be described in which, embodiments for ascertaining suitable amounts of polycarboxylic acid-based water reducing agent, anhydrous gypsum, a water retentive agent, a carbon-based powder, an anti-foaming agent and water, as materials for a mortar composition in accordance with this invention are given.

[Optimization of Polycarboxylic Acid-Based Water Reducing Agent]

In the present invention, a polycarboxylic acid-based water reducing agent is added to a mortar composition to disperse mortar materials (cement particles) uniformly in water. This enables water content in the mortar composition to be reduced at the same time to maintain softness to such an extent that workability is ensured.

Conventionally, numerous researches have been performed for using a polycarboxylic acid-based water reducing agent in a mortar composition. A polycarboxylic acid-based water reducing agent is highly capable of uniformly dispersing mortar materials in water, but at the same time, it has a disadvantage that when used in a mortar composition, the mortar composition takes longer time to harden. Therefore, when adding a polycarboxylic acid-based water reducing agent in a mortar composition, chemical agent such as an accelerator is needed to enhance the initial stage strength of the mortar composition, and the chemical agents used for enhancing the initial stage strength adversely affect the durability or workability of the mortar composition from time to time. The inventors of this invention directed their attention toward a combination of a polycarboxylic acid-based powdered water reducing agent and high-early-strength portland cement, and have made a finding that if a suitable mixing form is selected, the hardening time can be reduced and the initial stage strength of a mortar composition can be improved without using chemical agents such as an accelerator for enhancing initial stage strength. In other words, it has been verified that with high-early-strength portland cement suitable for this invention, "the compressive strength, measured on 3rd day after execution of work in accordance with JIS A 6916, is $18.0 \text{ N/mm}^2$ or more when high-early-strength portland cement, a polycarboxylic acid-based water reducing agent, silica sand and water alone are mixed (refer to FIG. 1)". Thus, a mortar composition having high ability to infiltrate into a surface to which the mortar composition is to be adhered, and high bonding strength due to its anchoring effect, while ensuring sufficient initial stage strength can be obtained. A polycarboxylic acid-based water reducing agent with good compatibility to yield a compressive strength, measured on 3rd day after execution of work in accordance with JIS A 6916, is $18.0 \text{ N/mm}^2$ or more when high-early-strength portland cement, a polycarboxylic acid-based water reducing agent, silica sand and water alone are mixed, is methoxy (polyethlyene glycol) methacrylate copolymer.

With regard to the types of polycarboxylic acid-based water reducing agent, one kind was selected from commercially available polycarboxylic acid-base water reducing agent, and comparative examination was performed varying the amount or the polycarboxylic acid-based water reducing agent added. A test was carried out using the water reducing agent in the amounts of 0.5 g, 1 g, 1.5 g and 3 g, and measured the compressive strength on 3rd day, 7th day, 14th day and 28th day, flexural strength on 7th day, 14th day and 28th day, and bonding strength on 7th day, 14th day and 28th day. FIG. 1 shows the physical properties measured for a mortar composition prepared by mixing the water reducing agent with 380 g of high-early-strength portland cement (HES portland cement in the figure), 600 g of No. 6 silica sand and 200 g of water.

As shown in the same figure, for specimens 1-1 to 1-5, the changes in physical properties of flowability, workability, compressive strength, flexural strength and bonding strength were observed while changing the amounts of polycarboxylic acid-based water reducing agent (PAB water reducing agent in the figure) added as, 0 g (1-1), 0.5 g (1-2), 1.0 g (1-3), 1.5 g (1-4), and 3.0 g (1-5), but fixing the amounts of high-early-strength portland cement (380 g), No. 6 silica sand (600 g) and water (200 g). As is apparent from the figure, in this example, the specimen 1-3 (1.0 g) was ascertained of showing the highest value in any one of compressive strength (38.2 N/mm$^2$), flexural strength (4.9 N/mm$^2$) and bonding strength (2.23 N/mm$^2$). Accordingly, in this example, the optimum amount of added polycarboxylic acid-based water reducing agent is determined to be 1 g.

If the amount of polycarboxylic acid-based water reducing agent used is too small, satisfactory infiltration/anchoring effect may not be obtained. Conversely, if the amount is too large, the problem of retarding aggregation arises. From the test result, it is ascertained that the suitable amount of polycarboxylic acid-based water reducing agent to be used is approximately 1.0 g to 1.5 g. In addition, a compatibility issue exists between polycarboxylic acid-based water reducing agent and high-early-strength portland cement, and the test result of this example shows that the compressive strength on 3rd day after execution of work is 18.2 N/mm$^2$, thus the polycarboxylic acid-based water reducing agent is ascertained of having a good compatibility with high-early-strength portland cement (compressive strength on 3rd day after execution of work>18 N/mm$^2$).

The term "binder" used in the figure includes cement and a water reducing agent, and the term "powder" includes cement, a water reducing agent, and sand. Although the strength varies slightly depending on the kind of water reducing agent used, any kind of water reducing agent can provide sufficient infiltration/anchoring effect for practical applications, as long as suitable amount is used.

[Addition of Gypsum and/or Hydrate Thereof]

In this invention, gypsum and/or hydrates thereof are used as materials for a mortar composition to improve the expansion force and prevent cracks from occurring due to the contraction by hardening when cement is hardened. Further, this enables initial stage strength, such as bonding strength, compressive strength or flexural strength, to be improved at the same time.

As a gypsum used in this invention, one kind, or two or more kinds of gypsums can be appropriately selected from gypsum dihydrate, hemihydrate gypsum and anhydrous gypsum. However, anhydrous gypsum is most preferable, since it provides the stability after hardening.

To verify the correlation between the amount of gypsum mixed and physical values, the compressive strength on 3rd day, 7th day, 14th day and 28th day, flexural strength on 7th day, 14th day and 28th day, and bonding strength on 7th day, 14th day and 28th day were measured using gypsum in amounts of 0 g (2-1), 5 g (2-2), 10 g (2-3) and 15 g (2-4). FIG. 2 shows the resultant physical properties measured for a mortar composition prepared by mixing the gypsum with 380 g of high-early-strength portland cement, 1.0 g of water reducing agent, 600 g of No. 6 silica sand and 200 g of water.

As shown in the same figure, for specimens 2-1 to 2-4, the changes in physical properties of flowability, workability, compressive strength, flexural strength and bonding strength were observed while changing the amount of anhydrous gypsum added as, 0 g (2-1), 5 g (2-2), 10 g (2-3) and 15 g (2-4), but fixing the amounts of high-early-strength portland cement (380 g), polycarboxylic acid-based powdered water reducing agent (1.0 g), No. 6 silica sand (600 g) and water (200 g). As is apparent from the figure, in this example, the specimen 2-2 (5 g) was ascertained of showing the highest value in any one of compressive strength (41.4 N/mm$^2$), flexural strength (5.3 N/mm$^2$) and bonding strength (2.42 N/mm2). Accordingly, in this example, the optimum amount of added anhydrous gypsum is determined to be 5 g. The term "binder" used in the figure includes cement, gypsum and water reducing agent, and the term "powder" includes cement, gypsum, water reducing agent and sand.

If the amount of gypsum mixed is too small, a problem arises that it becomes more susceptible to cracks upon contraction due to hardening. Conversely, if the amount is too large, a problem arises that it becomes more susceptible to cracks due to high expansion force. Since cement itself includes gypsum, depending on the kind of cement, gypsum need not be added externally. The inventors of this invention have concluded that, from the viewpoint of a balance of workability and various strength values, the amount of gypsum externally added is preferred to be 10 g or less.

[Addition of Water Retentive Agent]

Addition of a water retentive agent to a mortar composition can provide higher water retentivity and infiltrating ability. In cement or mortar, if too much water is evaporated, the viscosity is increased and becomes difficult to work with. Accordingly, use of an additive having water retentivity contributes to the workability. In addition, by using a water retentive agent, the compatibility is increased and allows the mortar composition to infiltrate into fine grooves or depressions on a surface of the object, thereby bonding to the object more firmly.

As a water retentive agent used in this invention, one kind, or two or more kinds of water retentive agents can be appropriately selected from commonly used water retentive agents such as cellulose water retentive agents, acrylic water retentive agents and vinyl water retentive agents. However, preferred water retentive agents are, for example, methylcellulose, hydroxyethylcellulose and methylhydroxyethylcellulose. Further, methylcellulose is the most preferable from the view point of contributing to the water retentivity and infiltration ability.

A water retentive agent was selected from the commercially available water retentive agents having methylcellulose as a chief ingredient, and a comparative examination was performed varying the amount of the water retentive agent added. A test was carried out measuring the compressive strength on 3rd day, 7th day, 14th day and 28th day, flexural strength on 7th day, 14th day and 28th day, and bonding strength on 7th day, 14th day and 28th day, while changing the amount of water retentive agent used in the amounts of 0 g (3-1), 0.5 g (3-2), 1 g (3-3), 1.5 g (3-4) and 3 g (3-5) FIG. 3 shows the resultant physical properties measured for a mortar composition prepared by mixing the water retentive agent with 380 g of cement C, 5 g of anhydrous gypsum, 1 g of water reducing agent B, 600 g of No. 6 silica sand and 200 g of water.

As shown in the same figure, for specimens 3-1 to 3-5, the changes in physical properties of flowability, workability, compressive strength, flexural strength and bonding strength were observed while changing the amount of water retentive agent added as, 0 g (3-1), 0.5 g (3-2), 1.0 g (3-3), 1.5 g (3-4), and 3.0 g (3-5), but fixing the amounts of high-early-strength portland cement (380 g), anhydrous gypsum (5.0 g), polycarboxylic acid-based powdered water reducing agent (1.0 g), No. 6 silica sand (600 g) and water (200 g)

As is apparent from the figure, in this example, the specimen 3-3 (1.0 g) was ascertained of showing the highest value in any one of compressive strength (49.6 N/mm$^2$), flexural strength (6.3 N/mm$^2$) and bonding strength (2.90 N/mm$^2$). Accordingly, in this example, the optimum amount of added water retentive agent is determined to be 1.0 g. The term "binder" used in the figure includes cement, gypsum, water reducing agent and water retentive agent, while the term "powder" includes cement, gypsum, water reducing agent, water retentive agent and sand.

If the amount of water retentive agent used is too small, satisfactory water retentivity may not be obtained. Conversely, if the amount is too large, the viscosity of the mortar composition is excessively improved and the flow value is decreased, which may deteriorate the workability. The inventors of this invention have concluded that, the amount of water retentive agent used is preferably 0.5 g to 1.5 g, from the viewpoint of a balance of workability and various strength values. Although the strength varies slightly depending on the kind of water retentive agent used, any kind o water retentive agent can be used for practical applications, as long as suitable amount is used.

[Addition of Carbon-Based Powder]

In the mortar composition in accordance with this invention, addition of a carbon-based powder is preferable, since effects such as improved workability, strengthened surface hardness and accelerated hydration of cement can be obtained.

Fine particles of carbon-based powder are electrically polarized and discharge electrons when mixed in the presence of water, and when the discharged electrons collide with molecules of water or cement particles, heat is generated and the hydration of cement is accelerated. Generally, the higher the temperature, the higher the acceleration of hydration of cement.

As a carbon-based powder used in this invention, one kind, or two or more kinds of carbon-based powders can be appropriately selected from commonly used carbon-based powders such as powdered carbon and granular carbon. However, powdered carbon is generally preferred for providing high surface hardness in a uniform manner.

To verify the amount of carbon-based agent to be mixed, a test measuring the compressive strength on 3rd day, 7th day, 14th day and 28th day, flexural strength on 7th day, 14th day and 28th day, and bonding strength on 7th day, 14th day and 28th day, was carried out using a carbon-based agent in amounts of 0 g (4-1), 10 g (4-2), 20 g (4-3), 40 g (4-4) and 15 g (4-5) FIG. 4 shows the resultant physical properties measured for a mortar composition prepared by mixing the carbon-based agent with 380 g of high-early-strength portland cement, 5 g of anhydrous gypsum, 1 g of polycarboxylic acid-based water reducing agent, 1.0 g of water retentive agent, 600 g of No. 6 silica sand and 200 g of water.

As is apparent from the figure, in this example, the specimen 4-5 (15 g) was ascertained of showing the highest value in any one of compressive strength (55.0 N/mm$^2$), flexural strength (6.3 N/mm$^2$) and bonding strength (2.73 N/mm$^2$). Accordingly, in this example, the optimum amount of carbon-based powder added is determined to be 15 g. The term "binder" used in the figure includes cement, gypsum, water reducing agent, water retentive agent and carbon-based powder, and the term "powder" includes cement, gypsum, water reducing agent, water retentive agent, carbon-based powder and sand.

If the amount of carbon-based powder used is too small, sufficient surface hardness may not be obtained. Conversely, if the amount is too large, the long term compressive strength may deteriorate. The inventors of this invention have concluded that in this invention, a carbon-based powder may be added, particularly when used for applications that require initial stage strength, and the amount to be added is preferably 10 to 20 g from the viewpoint of a balance between workability and various strength values.

[Addition of Anti-Foaming Agent]

In the mortar composition in accordance with this invention, in order to bring two conflicting physical properties, the strength and the flow value, both above standards, consideration has been given to the materials to be used, and the amount of the materials to be mixed. Particularly, the proportion of the binder (materials other than sand and water) is high, since priority is placed on enhancing the strength, the resultant mortar composition has high strength, but also has high viscosity. Therefore, the mortar composition has a tendency to allow air bubbles to remain entrapped in the composition when mixing the materials. Thus, an anti-foaming agent is used to solve this problem. Addition of an anti-foaming agent enables the amount of air bubbles in the mortar composition to be adjusted, thereby making it easy to achieve a target flow value.

To verify the amount of anti-foaming agent to be mixed, a test measuring the compressive strength on 3rd day, 7th day, 14th day and 28th day, flexural strength on 7th day, 14th day and 28th day, and bonding strength on 7th day, 14th day and 28th day was carried out using an anti-foaming agent in amounts of 0 g (5-1), 1 g (5-2), 2 g (5-3) and 3 g (5-4). FIG. 5 shows the physical properties measured for a mortar composition prepared by mixing the anti-foaming agent with 380 g of high-early-strength portland cement, 5.0 g of anhydrous gypsum, 1.0 g of polycarboxylic acid-based water reducing agent, 1.0 g of water retentive agent, 15.0 g of carbon-based powder, 600 g of No. 6 silica sand and 200 g of water.

As is apparent from the figure, in this example, the specimen 5-3 (2.0 g) was ascertained of showing the highest value in any one of compressive strength (62.6 N/mm$^2$), flexural strength (7.2 N/mm$^2$) and bonding strength (3.11 N/mm$^2$). Accordingly, in this example, the optimum amount of anti-foaming agent added is determined to be 2.0 g. The term "binder" used in the figure includes cement, gypsum, a water reducing agent, a water retentive agent, a carbon-based powder and an anti-foaming agent, while the term "powder" includes cement, gypsum, a water reducing agent, a water retentive agent, a carbon-based powder, an anti-foaming agent and sand.

If the amount of anti-foaming agent used is too small, too much air bubbles remain in the mortar composition, and may cause the strength of the mortar composition to deteriorate. Conversely, if the amount is too large, air bubbles are reduced by too much, and may cause the flowability of the composition to diminish, and may deteriorate the workability. The inventors of this invention have concluded that in this invention, the amount of anti-foaming agent to be used is preferably 1 to 2 g from the viewpoint of a balance between workability and various strength values.

[Amount of Water Used]

In handling cement or mortar, water is necessary to ensure suitable workability thereof. However, use of excessive water causes a problem of diminishing the bonding strength, compressive strength and flexural strength of products. Therefore, in determining the proportion of water to be used, the amount and kind of water reducing agent and water retentive agent used are important issues in producing products such as cement and mortar. In the mortar composition in accordance with this invention, the amount of water used can also be adjusted, since the flow value of the composition is adjusted to working conditions at each job site by using a powdered mortar material mixture.

To specify the amount of water to be used within a range that allows the mortar composition to maintain sufficient strength, a test measuring the compressive strength on 3rd day, 7th day, 14th day and 28th day, flexural strength on 7th day, 14th day and 28th day, and bonding strength on 7th day, 14th day and 28th day was carried out using water in amounts of 100 g (6-2), 150 g (6-3), 200 g (6-1), 250 g (6-4) and 300 g (6-5). FIG. 6 shows the physical properties measured for a mortar composition prepared by mixing water with 380 g of high-early-strength portland cement, 5.0 g of gypsum, 1.0 g of polycarboxylic acid-based water reducing agent, 1.0 g of water retentive agent, 15.0 g of carbon-based powder, 2.0 g of anti-foaming agent and 600 g of No. 6 silica sand.

The term "binder" used in the figure includes cement, gypsum, a water reducing agent, a water retentive agent, a carbon-based powder and an anti-foaming agent, while the term "powder" includes cement, gypsum, a water reducing agent, a water retentive agent, a carbon-based powder, an anti-foaming agent and aggregate.

If the amount of water used is too small, the viscosity of the mortar composition is increased and the workability may deteriorate. Conversely, if the amount is too large, sufficient strength of the mortar composition may not be obtained after hardening, and in addition, the workability may deteriorate due to, for example, occurrence of excess water (bleeding) at the time of trowel finishing. In light of the above problems and determining from the test results, in this example, the amount of water to be used is 150 to 250 g. The flow value is preferably about 150 to 250 mm, taking the workability and the like, of the mortar composition into consideration.

[Mechanism]

One of the problems of conventional cement mortar, is a property of deterioration due to repeated expansion/contraction, caused by a mechanism that a conventional cement mortar is susceptible to absorbing water since it contains a large amount of air bubbles, and as a result, becomes susceptible to repeating expansion/contraction. On the other hand, the mortar composition in accordance with this invention, has good compatibility among materials providing uniform dispersement, thereby large voids are less likely to occur among the particles of each ingredients and the amount of air bubbles thereof is low after the execution of work. Therefore, expansion/contraction hardly occurs as a result.

Further, the mortar composition in accordance with this invention has excellent properties, such as a high followability to the object to be bonded, due to high bonding strength, high strain level, which conventional mortar composition were not able to obtain. It is presumed that these properties result from, what is called, an anchoring effect produced by cement particles being dispersed uniformly in water, and thus, the cement particles and cement gel infiltrate into fine grooves on the surface to be bonded, and expand during the hardening process. This is backed up by a remarkable fact that the mortar composition in accordance with this invention tan bond even to a surface of a cut granite (only extremely fine grooves exist thereof).

Further, the mortar composition in accordance with this invention also has a property of being capable of withstanding an application of relatively heavy load, since the compression strength and flexural strength are high. The reason the mortar composition has such property, is also presumed that the cement particles are dispersed uniformly in water causing hydration to occur evenly all over the circumference of each cement particle while producing ettringite, which in turn disperses each cement particle uniformly, thereby dispersing a load applied externally.

Figure 11:
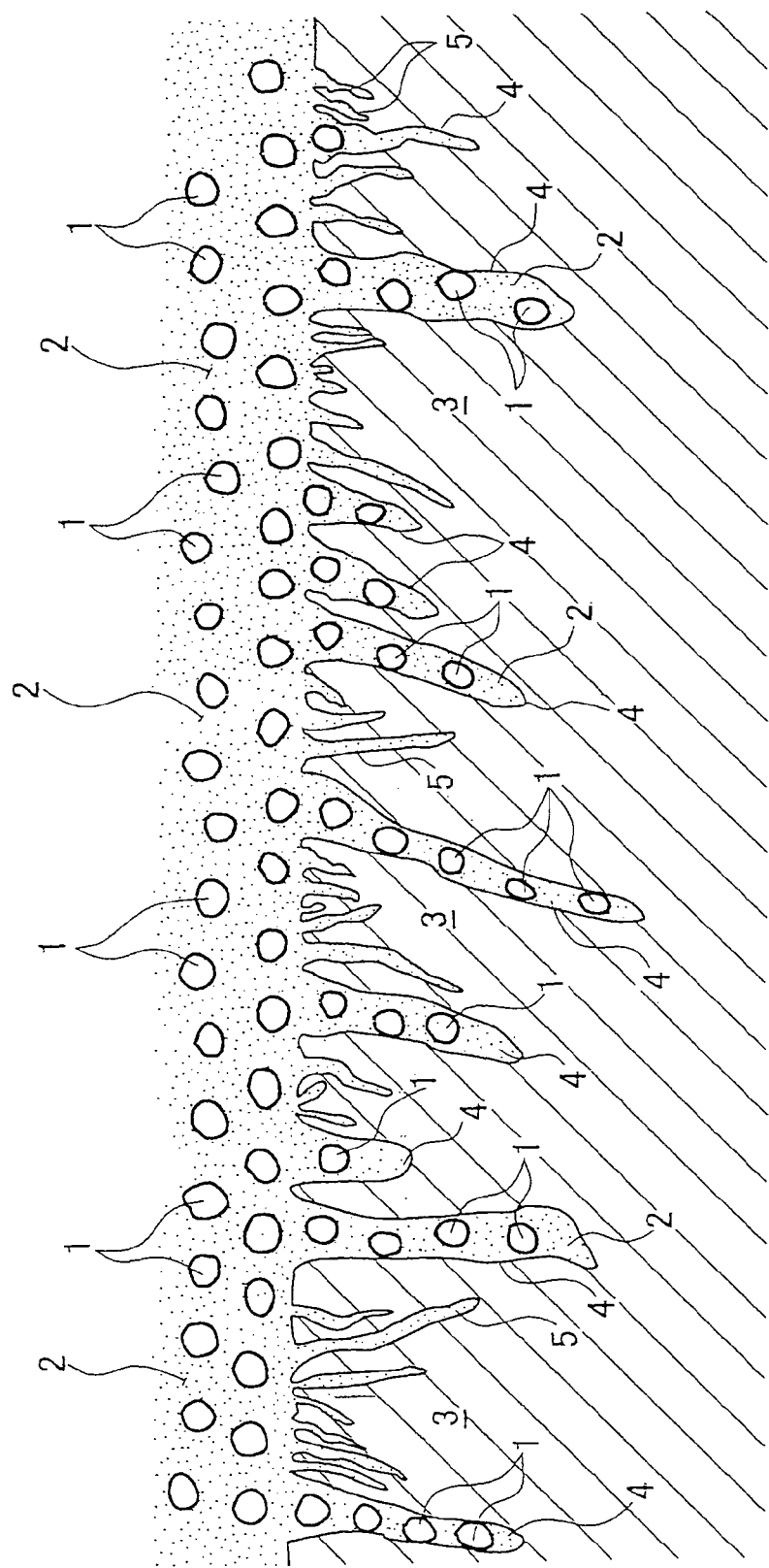
FIG. 11 is a view showing an interfacial structure of a mortar composition and an object to which the mortar composition has been bonded (uniformly dispersing state)
Figure 12:
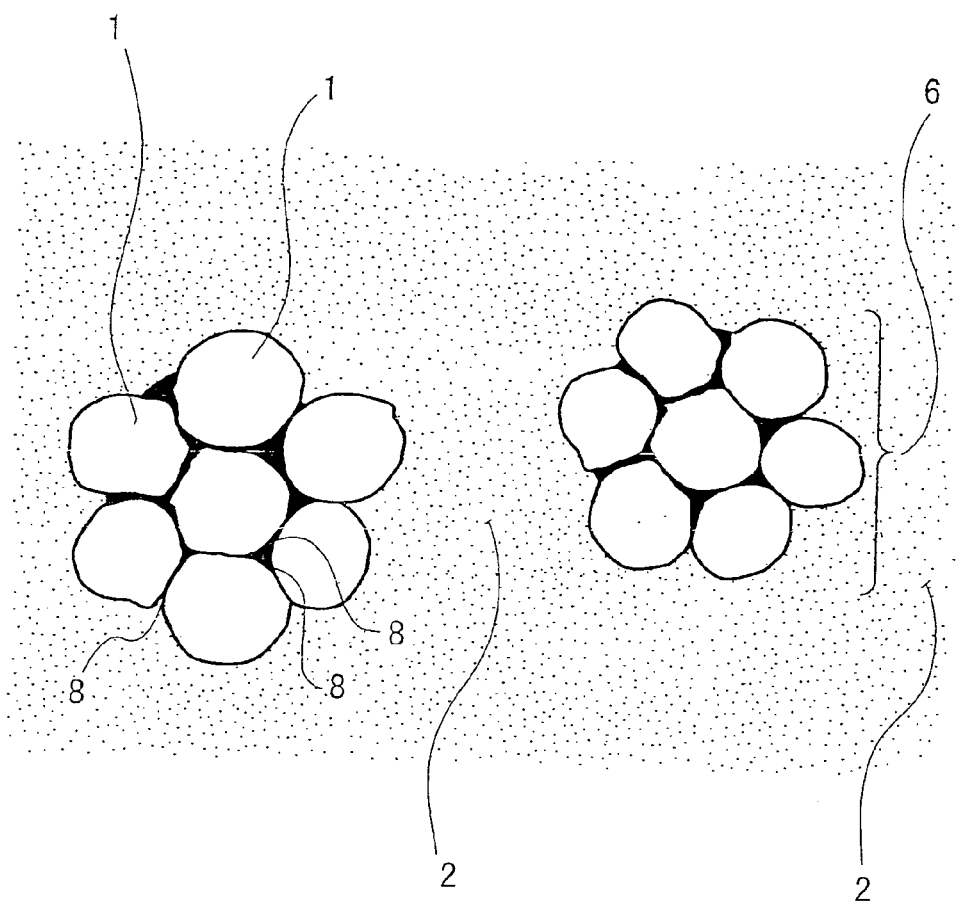
FIG. 12 is a view showing a state in which cement particles are aggregated.
Figure 13:
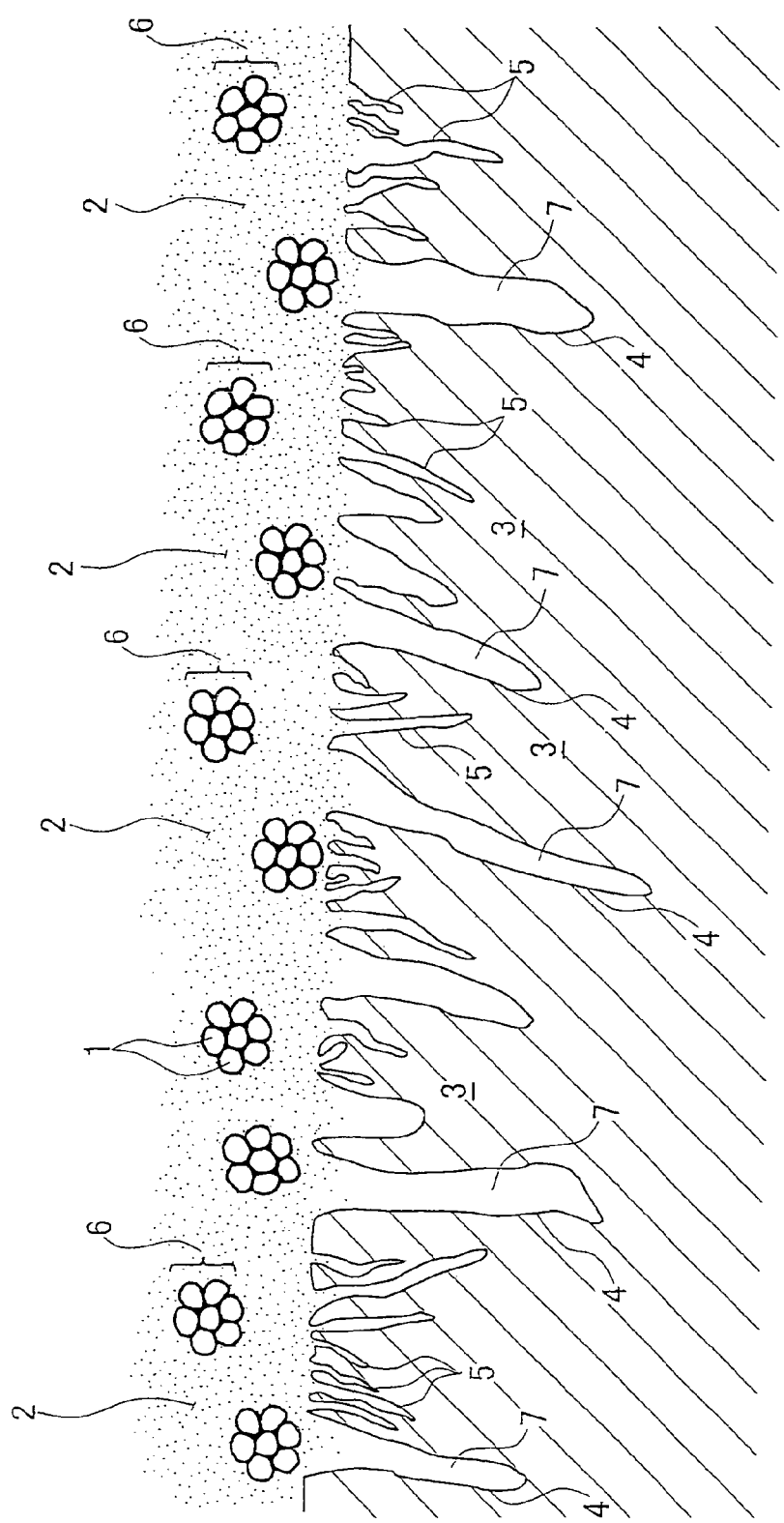
FIG. 13 is a view showing an interfacial structure of a mortar composition and an object to which the mortar composition has been bonded (aggregated state)

A dispersion form of the cement particles presumed by the inventors of this invention will be described below. FIG. 10 shows a state of dispersion for cement particles of a mortar composition in accordance with this invention FIG. 11 shows a model of interfacial structure of a mortar composition and an object to be bonded. FIG. 12 shows a state of dispersion for which cement particles of a conventional cement mortar composition. FIG. 13 shows a model of interfacial structure of a conventional cement mortar composition and an object to be bonded.

In the same figures, reference numeral 1 denotes a cement particle, numeral 2 denotes a cement gel, numeral 3 denotes an object to be bonded (for example, concrete wall surface), numeral 4 denotes a hole or depression existing on the surface of an object to be bonded which has a diameter a little larger than that of a cement particle (hereinafter referred to as "large diameter hole"), numeral 5 denotes a hole or depression existing on the surface of an object to be bonded which has a diameter sufficiently small compared with that of a cement particle (hereinafter referred to as "small diameter hole") numeral 6 denotes an aggregate of cement particles, numeral 7 denotes an air bubble (unfilled portion) and numeral 8 denotes an unhydrated area occurring inside the aggregate of cement particles.

It is presumed, as shown in FIG. 10, a mortar composition in a form of a paste obtained by pouring water over a powdered mortar material mixture in accordance with this invention (that is, a mixture of high-early-strength portland cement, a polycarboxylic acid-based powdered water reducing agent and sand and further mixing water retentive agent powder, anti-foaming agent powder and/or carbon-based powder appropriately) and fully mixing the water with mixture, cement particles 1 do not aggregate, but are in a state of being dispersed uniformly (separately), and each cement particle 1 is in contact with water on its entire circumferential surface causing hydration, thereby a sufficient amount of cement gel 2 is formed on the circumference of each cement particle 1. Therefore, as shown in FIG. 11, if such mortar composition in a form of a paste is applied on a surface of an object to be bonded in an appropriate thickness, the cement gel 2 infiltrates deeply into large diameter holes 4 as well as small diameter holes 5 filling the inside thereof, and at the same time, cement particles 1 themselves infiltrate into the large diameter holes 4, thereby extremely high bonding strength is developed by an anchoring effect as the particles 1 and cement gel 2 harden and expand. The term "bonding strength" used herein can be replaced by "anchoring force". The term "anchoring force" used herein, is a force determined by the strength of anchor-like portions which are formed when cement gel infiltrates and fills fine grooves or depressions on the surface of concrete and functions as an anchor. In this respect, the term "bonding strength" used herein is greatly different from the term "bonding strength" used in an organic adhesive which is specified by a strength of adhesion at an interface. In the mortar composition in accordance with this invention, if a water retentive agent is added thereto, surface activity is further improved, and the mortar composition can infiltrate into fine grooves or a surface to which the composition is to be applied easily, thus anchoring force (that is, bonding strength) is enhanced.

It is also presumed that since adjacent cement particles are not only arranged in an orderly manner, but also dispersed uniformly via ettringite formed during the hardening process of cement gel 2, externally applied force is received by the cement particles in a distributed manner, preventing the force from being concentrated and thereby enabling the development of properties such as high compressive strength, high flexural strength and high strain level.

On the other hand, it is presumed, as shown in FIG. 12, that a conventional mortar composition in a paste form, has adjacent cement particles 1 gathered to form a cement particle aggregate 6. Therefore, cement particles 1 contributing to hydration are only those exposed to the outside surface of the cement aggregate 6. Thereby, the amount of cement gel 2 formed from the entire mortar composition is considerably less compared with the mortar composition in a paste form in accordance with this invention. Thus, if such a mortar composition in a paste form is applied on a surface of the object 3 to be bonded in an appropriate thickness, as shown in FIG. 13, cement gel 2 can infiltrate into inside of the large diameter hole to some extent, but can hardly infiltrate into small diameter hole 5. Also, cement particles 1 cannot infiltrate into inside of the large diameter hole 4 either, since they become bulky by forming an aggregate 6. Therefore, even if the cement particles harden and expand, anchoring effect is hardly produced, and high bonding strength is not developed.

In addition, at the central part of the cement particle aggregate 6, where water hardly comes into contact, an unhydrated areas 8 having low strength remains. Therefore, if a large force is applied externally to the mortar composition, crushing or particle separation due to stress concentration occurs at the unhydrated areas 8. Further, the unhydrated areas 8 are presumed to be a possible contribution to deterioration with age. Moreover, since the amount of cement gel 2 formed by hydration is small, the bonding force among cement particles or cement aggregates 6 is relatively low. As a result, properties such as high compressive strength, high flexural strength and high strain level, which can be achieved by the mortar composition in accordance with this invention, are not developed.

[Mixing of Materials]

As described above, the mortar composition of this invention can be prepared by pouring water over a powdered mortar material including polycarbon acid-based powdered water reducing agent and mixing the same. The mixing operation can be carried out with commonly used mixing apparatus such as an electric hand-mixer or an agitating device equipped with a container (barrel). As a suitable agitating devices equipped with a container, for example, a device disclosed in Japanese Utility Model Laid-Open No. 3023035 can be given. The agitating time varies depending on various conditions such as the amount of water used, temperature and humidity, but when using a hand-mixer, the agitation is performed at 500 to 750 rpm for approximately 5 to 7 minutes.

An agitator used for the experiments in this application is generally called an automatic agitator of barrel mount type. This agitator has a feature in which the agitating means is not a fan (see FIG. 14 and FIG. 15) but a linear blade plate 104 extending radially along the bottom of a mixing barrel A, having an inner diameter D, supported by a pair of support rods 105, and rotated about an agitating shaft 102. The support rods 105 have a vertical portion 105a, a bevel portion 105b, an upper sub-blade 105c and a lower sub-blade 105d. The total length of linear blade plate 104 from the tip of one end to the tip of the opposite end is L in FIG. 15. With this blade construction, low agitating load is ensured in the rotation since rotating resistance is very little.

Agitating shaft 102 is connected to a motor shaft 107 via fitting hole 103. An electric motor 106 is mounted on the mixing barrel A using a motor support member 110 which is fixed to the upper portion of the barrel A by clamp metal fittings 114. Motor support member 110 further comprises a base plate 111 connected to support arms 112, further connected to guide plates 113 which are attached to the clamp metal fittings 114.

For the purpose of evaluation, it is recommended to have an agitating device with a rating of 100 V, 8.5 A, 560 rpm, 50-60 Hz and a barrel capacity of 75 liters. Such an agitator is made by the Yabuhara Company of Tokyo, Japan, and is named TARUMARUKUN.

To evaluate the mixing of materials of the present invention as compared with other compositions, nine (9) samples each having a weight (without water) of 25 kg with the cement, sand, water amounts being the same, were prepared as follows.

Sample M(A) (Present invention): A polycarboxylic acid-based water reducing agent is A which includes a methacrylate acid-based component and has good compatibility.

Sample M(−): No polycarboxylic acid-based water reducing agent was used.

Samples M(B) to M(I): The following polycarboxylic acid-based water reducing agents were used which do not have good compatibility.

B: polycarboxylic acid ether-based compound;

C: complex of polycarboxylic acid ether-based compound and molecular cross-linked polymer;

D: polycarboxylic acid compound (main chemical ingredient);

E: plural polymer containing polycarboxylic acid groups having sulfonic acid groups as end groups (main chemical ingredient);

F: plural polymer containing polycarboxylic acid groups having sulfonic acid groups as end groups (main chemical ingredient);

G: polycarboxylic acid-based compound; and

H: polycarboxylic acid-based compound.

Figure 14:
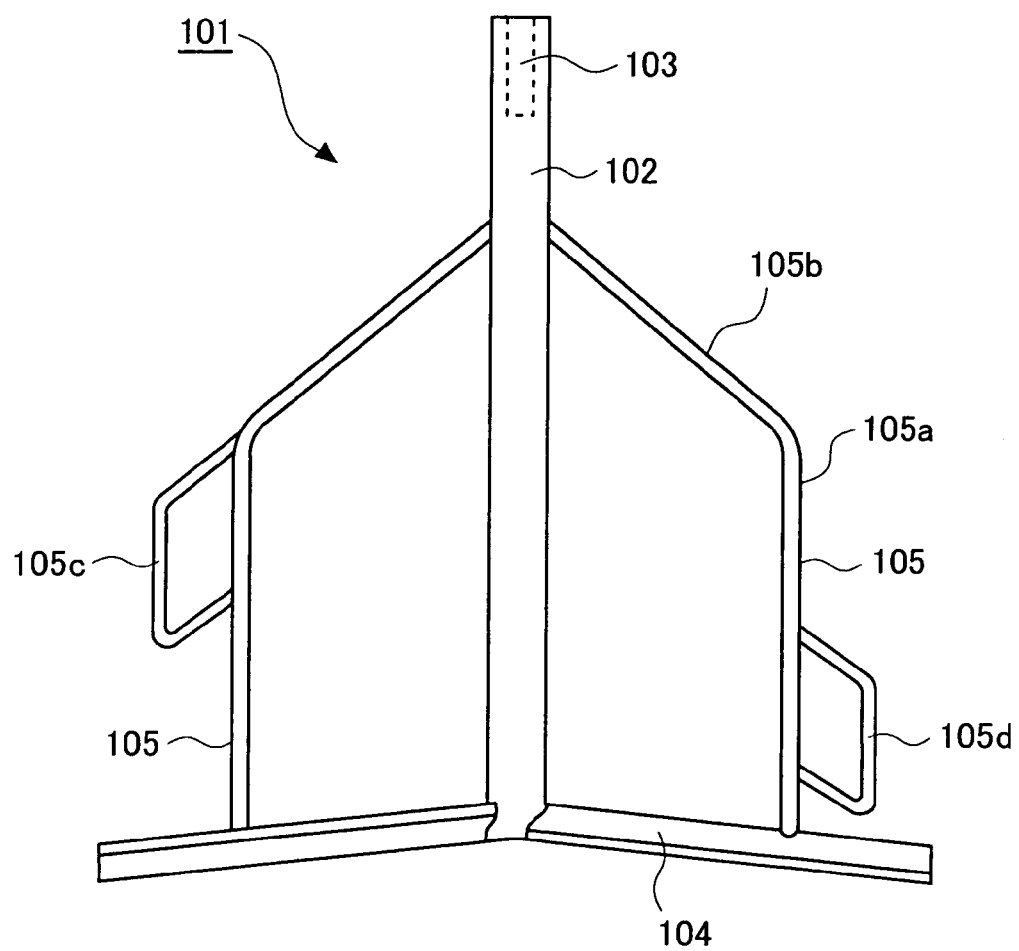
FIG. 14 shows an agitating blade main body of an agitating device suitable for mixing the mortar composition of the present invention.
Figure 15:
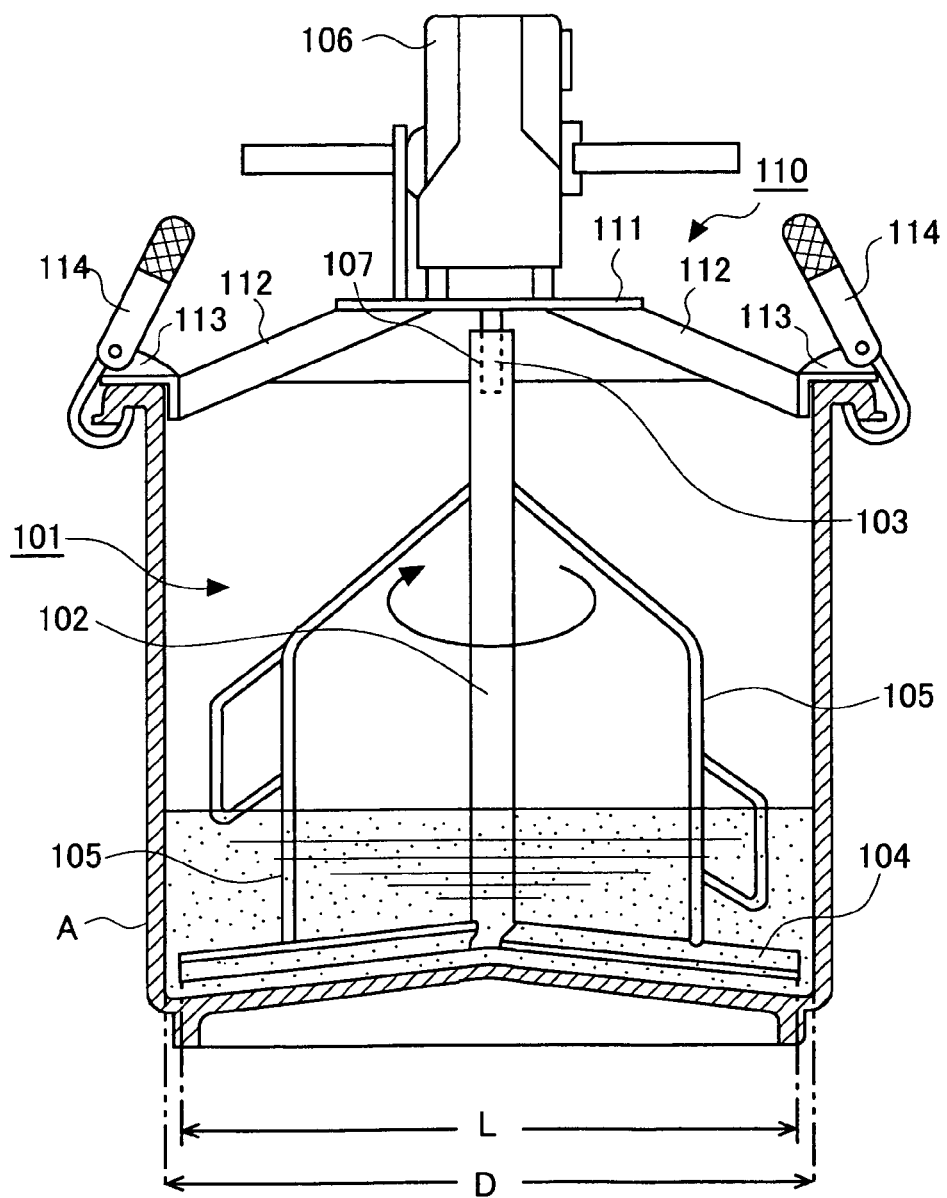
FIG. 15 shows the agitating device in use inside a container holding the mortar composition.

Next, each of those samples (comprising 25 to 45 parts weight of high-early-strength Portland cement, 40-60 parts by weight of sand, 0.05 to 0.12 parts by weight of polycarboxylic acid-based powdered water reducing agent) having a total weight of 25 kg were poured into a barrel where 10 to 25 parts by weight of water are already filled and an agitator, as shown in FIG. 14 and FIG. 15, is on and is rotating. Motor current was measured and recorded in amperes at every 0.5 minutes during a process of agitation (0 minutes to 10 minutes).

Figure 18:
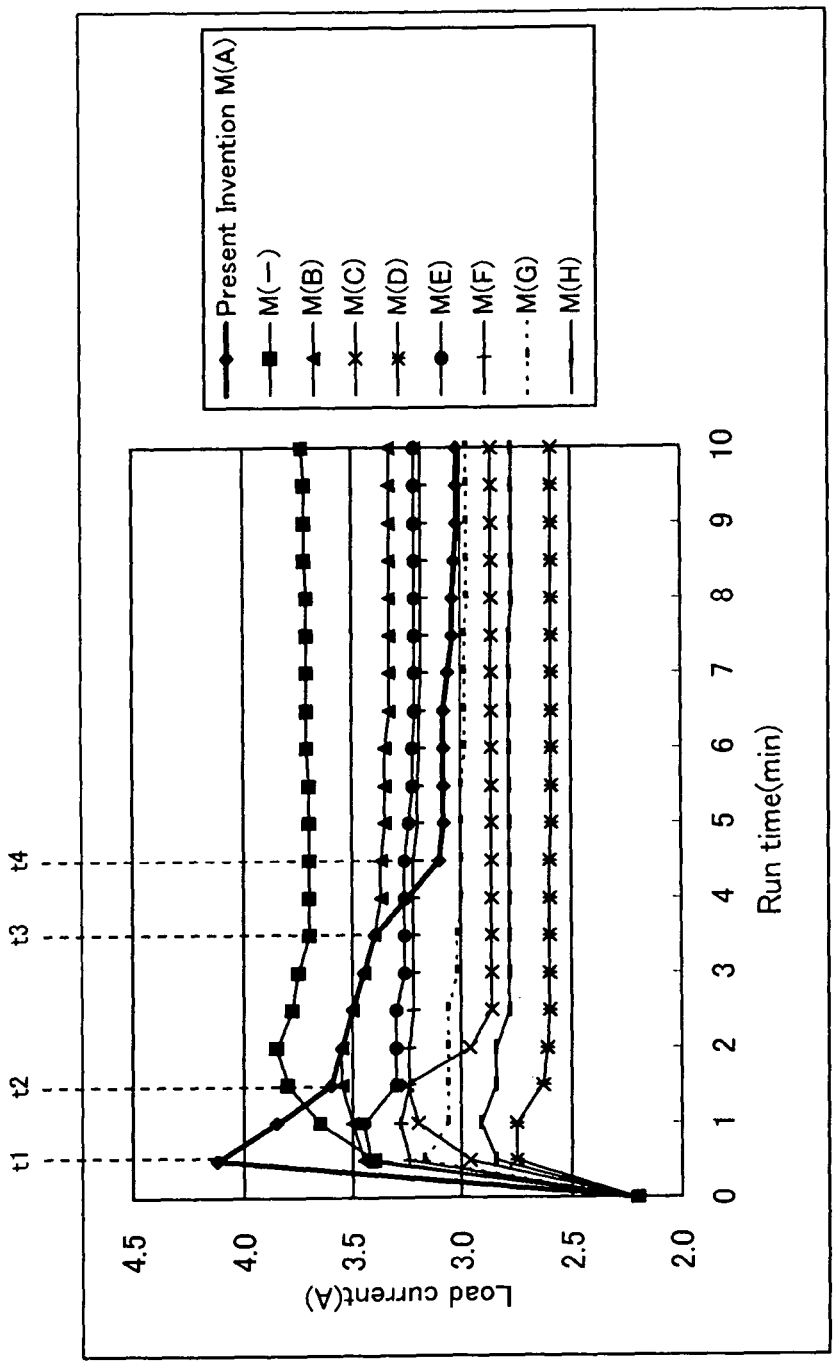
FIG. 18 is a graphical representation of FIG. 17.

Finally, an analysis was made of the recorded current value (See FIG. 17 and FIG. 18).

As shown in FIG. 18, in the case of the present invention, load current rapidly increases from an initial value (2.20 A at 0) to a peak value (4.12 A at t1) during a increase period (0 to t1). In the increase period, the initial value (2.2 A) corresponds to a load current when the agitator is agitating water alone, and the peak value (4.12 A) nearly corresponds to a load current when the entire mixture of 25 kg is poured out into the barrel. In this example, the increase period has a time duration of about 0.5 minutes and a total increase during the increase period is 1.92 (=4.12−2.20) A. So, the term "rapidly increase" can also be expressed as "average increase ratio of 3.84 A/min".

Following t1, the load current rapidly decreases from the peak value (4.12 A at t1) to a first intermediate value (3.60 at t2) during a first decrease period (t1 to t2). In this example, the first decrease period has a time duration of about 1.0 minute and a total decrease during the first decrease period is 0.52 (=4.12−3.60) A. so, the term "rapidly decrease" can be expressed as "average decrease of 0.52 A/min".

Following t2, the load current slowly decreases from the first intermediate value (3.60 A at t2) to a second intermediate value (3.40 A at t3) during a second decrease period (t2 to t3). In this example, the second decrease period has a time duration of about 2.0 minutes and a total decrease during the second decrease period is 0.20 (=3.60−3.40) A. So, the term "slowly decrease" can be expressed as "average decrease ratio of 0.10 A/min".

Following t3, the load current rapidly decreases from the second intermediate value (3.40 A at t3) to a stabilized value (3.10 A at t4) during a third decrease period (t3 to t4). In this example, the third decrease period has a time duration of about 1.0 minute and a total decrease during the third decrease period is 0.30 (=3.40−3.10) A. So, the term "rapidly decrease" can be expressed as "average decrease ratio of 0.30 A/min".

As is apparent from the above explanation, in case of the present invention, the third decrease period (t3 to t4) of rapid decrease exists subsequent to the second period (t2 to t3) of slow decrease, while in the case of a mixture using B to H reducing agents, a period, such as the third decrease period, does not exists subsequent to the second period of slow decrease. In addition, in case of the present invention, a total decrease during the third decrease period (t3 to t4) corresponds to 15.63% of the total increase during the increase period (0 to t1). According to this fact, it is understood that the polycarboxylic acid-based powdered water reducing agent A having good compatibility with the mixture is clearly distinguished from those B to H not having good compatibility with the mixture, by confirming whether a characteristic corresponding to the third decrease period exists or not, and by confirming a total decrease during the third decrease period exceeding at least 10% of the total increase during a increase period.

Further, in the case of mixture using A, the load current goes up to the peak value (PV) of 4.12 A within 1.0 minute from the beginning, while in case of the mixture using B to H reducing agents, the load current does not go up to at most 3.5 A, or the peak time (PT) does not fall within 1.0 minute from the beginning. According to this fact, it is understood that the polycarboxylic acid-based powdered water reducing agent A having good compatibility with the mixture is clearly distinguished from those B to H not having good compatibility with the mixture, which is confirmed by whether the load current goes up to the peak value (PV) of at least 3.75 A within 1.0 minute from the beginning.

Furthermore, as shown in FIG. 18, in case of the mixture using A, the total decrease (TD) from t1 to 10 minutes time, relative to the total increase (TI) during the increase period (0 to t1), goes up to 57.29%; while in case of mixture using B to H reducing agents, the total decrease (TD) from peak time (PT) to 10 minutes time relative to the total increase (TI) during the increase period (0 to t1) goes at most up to 37.14%. According to this fact, it is understood that the polycarboxylic acid-based powdered water reducing agent A having good compatibility with the mixture is clearly distinguished from those B to H not having good compatibility with the mixture by confirming whether the total decrease peak value (PV) to 10 minutes value (10 minV) relative to the total increase (TI) initial value to peak value goes at least 45% or not.

Moreover, in the process of decrease, there are three periods (t1 to t2, t2 to t3, and t3 to t4) each showing different decreasing speed. It is estimated that the rapid decrease appearing during the first decrease period (t1 to t2) is due to the first adjustment of the mortar components; the slow decrease appearing in the second decrease period (t2 to t3) is due to the uniform dispersion of cement particles; and the rapid decrease appearing in the third decrease period (t3 to t4) is due to the second adjustment of the mortar component resulting from the promotion of generating cement gel.

On the other hand, in the case of conventional mortar (M(B) to M(H)), such a characteristics as appeared in the present invention, is not observed at all. Further, decreasing speed from the peak to the stabilized value is comparatively constant or uniform.

To allow the mortar composition of this invention to act effectively, it goes without saying that the materials must be mixed as uniformly as possible. After an intensive research, the inventors of this invention have made a finding that confirmation that the materials have been uniformly mixed can be obtained by a rapid decrease in agitating load in the agitator. Furthermore, the inventors have made another finding by experience that in conventional mortar compositions, a phenomenon of agitating load rapidly decreasing cannot be observed even when the materials have been uniformly mixed. When using a hand-mixer, the rapid decrease in agitating load can be confirmed by the magnitude of the agitating counteraction transmitted to a hand operating the mixer. When using an agitating device equipped with a container, rapid decrease in agitating load can be confirmed by the rapid decrease in load current of the electric motor or the increase in number of revolution of the agitating blade.

Further, whether the materials have been uniformly mixed or not can also be determined by the flow speed of the mortar composition. After intensive research, the inventors of this invention have made a finding that not a great difference have been observed in flow value between the fully mixed mortar composition and the mortar composition that have not been fully mixed, but with regards to the flow speed (time required for a mortar composition to flow a certain distance), a difference as much as twice in the flow speed arises. Accordingly, whether mortar materials are uniformly mixed or not can also be determined by the difference in flow speed.

A relationship between the degree of agitating the mortar composition and the flow state in accordance with this invention is shown in FIG. 9. The inventors of this invention prepared two specimens, a mortar composition of this invention of which agitation was continued until the agitating load rapidly decreases (sufficiently agitated specimen), and a mortar composition of this invention of which agitation was stopped before the agitating load rapidly decreases (insufficiently agitated specimen), and flow speed was measured for each specimen. Measurements were made using commonly used flow value measuring device. As is well known to those skilled in the art, the flow value measuring device includes a steel base plate for measuring the flow value, as shown in FIG. 9(*a*), and a cylindrical container arranged at a center portion of the steel base plate in upright position. In this example, a cylindrical container of 5 cm in diameter and 10 cm in height is used. On the steel base plate, concentric circles corresponding to the flow values (values of the travel distance) in the order of, 50 mm, 100 mm, 150 mm, 200 mm and 250 mm are drawn. Usually a flow value is determined in such a manner as to arrange a cylindrical container at the center (50 mm) of a steel base plate, fill the container with a specimen, then pick up the cylindrical container to allow the specimen to flow radially, and measure the distance of travel. In this example, a low-speed (10 Hz) vibrator was installed under the steel base plate to accelerate the flow of specimens. The term "flow speed" used herein is defined as the time needed for a mortar composition to reach each distance of travel (50 mm, 100 mm, 150 mm, 200 mm, 250 mm).

When measuring a flow speed of each specimen with the above assumption, for the specimen agitated sufficiently, flow speed values of 1.6 sec, 7.8 sec, 19.2 sec and 52.3 sec were obtained for the flow values of 100 mm, 150 mm, 200 mm and 250 mm respectively, as shown in FIG. 9(b). On the other hand, for the specimen agitated insufficiently, flow speed values of 5.5 sec, 14.5 sec, 42.2 sec and 104.8 sec were obtained for the flow values of 100 mm, 150 mm, 200 mm and 250 mm respectively, as shown in FIG. 9(c). The resulting ratios of flow speed when agitation was sufficiently carried out, to flow speed when agitation was insufficiently carried out were as large as 3.43 times, 1.86 times, 2.19 times and 2.0 times for the flow values of 100 mm, 150 mm, 200 mm and 250 mm respectively, and a large difference (approximately twice in value) were observed.

[Performance Comparison Test]

The mortar compositions of Examples 1 to 3 and Comparative Examples 1 to 3 were prepared by mixing necessary mortar materials in the proportions shown in FIGS. 7 and 8 with a high-speed hand-mixer (number of revolutions: 500 rpm or more, output: 750 W or more). In FIG. 7, methylcellulose is used as the water retentive agent, No. 6 silica sand is used as the silica sand, and powdered carbon is used as the carbon-based powder. In FIG. 8, No. 3 silica sand is used as the silica sand and styrene-butadiene rubber is used as the resin.

Whether the materials have been uniformly mixed or not can be ascertained by a rapid decrease in agitating load. The results of measuring compressive strength, flexural strength, bonding strength and strain level for the mortar compositions obtained in Examples 1 to 3 and Comparative Examples 1 to 3 are also shown in FIGS. 7 and 8.

The measurements of compressive strength, flexural strength, bonding strength and strain level for the mortar compositions obtained in Examples 1 to 3 and Comparative Examples 1 to 3, were performed in accordance with the following test methods.

The compressive strength test was carried out in accordance with JIS R 5201. The size of the test specimen was set to be 4.times.4.times. 16 cm. The materials were placed in the respective molding forms, and left to settle in a test room having a temperature of 20.degree. C. and a humidity of 80% for 24 hours. Then, after removal of molding forms, the specimen was subjected to air-curing in the test room. The aging of the test materials were performed for 28 days and compressive test was carried out using a load pressurizing plate in a compressive tester. A preferable compressive strength is 60.0 N/mm$^2$ or more.

The flexural strength test was carried out in accordance with JIS R 5201. The size of the test specimens were set to be 4.times.4.times. 16 cm. The materials were placed in the respective molding forms, and left to settle in a test room having a temperature of 20.degree. C. and a humidity of 80% for 24 hours. Then, after removal of the molding forms, the specimens were subjected to air-curing in the test room. The aging of the test materials was performed for 28 days, and flexural test was carried out using a load pressurizing plate in a compressive tester. A preferable flexural strength is 6.0 N/mm$^2$ or more considering crack preventing effect.

The bonding strength test was carried out in accordance with JIS A 916. Each specimen was applied on an object to be bonded (usually mortar board) to 1.5 mm thickness, and subjected to curing in a test room having a temperature of 20.degree. C. and a humidity of 80% or more. A tension jig 4.times.4 cm was fixed on a surface of each specimen the day before the testing, and the bonding strength test was performed while applying tensile force vertically to the specimen aged for 28 days. The bonding strength is preferably 2.0 N/mm$^2$ or more considering seismic safety.

The strain level test was carried out in accordance with JIS A 1149. A strain level measuring device was fixed at the center of each cylindrical test specimen made in accordance with JIS A 1132, "method of preparing test specimens for concrete strength test", and strain level (vertical strain) was measured while applying load to each specimen in a compressive tester specified in section 4, JIS A 1108, "method of testing concrete compressive strength". The aging of the test materials were performed for 28 days. The strain level is preferably 5000µ or more considering to achieve high followability.

The mortar composition obtained in Examples 1 to 3 had higher compressive strength and high flexural strength compared with those obtained in Comparative Examples 1 to 3. Materials having high compressive strength and high flexural strength are less likely to cause fracture and crack even when subjected to larger force, and maintain sufficient compressive strength and flexural strength even when thickness is decreased. Therefore, the amount of mortar composition used can be reduced, and becomes economical. Further, due to their high compressive strength and flexural strength, wider applications are possible compared to the conventional mortar products.

The mortar composition obtained in Examples 1 to 3 had higher bonding strength compared with those obtained in Comparative Examples 1 to 3, and the bonding strength was more than 2.0 N/mm$^2$, which is satisfactory from the viewpoint of seismic safety. In a resin mortar containing an organic adhesive, like that of the comparative example 3, a material having a bonding strength far greater than 2.0 N/mm$^2$ can be produced by increasing the amount of the organic adhesive used. However, use of an organic adhesive in a larger amount leads to higher costs and deterioration of durability, and hence becomes unpractical.

As is apparent from FIG. 7, the strain level of the mortar compositions obtained in Examples 1 to 3 is considerably high. As described above, higher strain level means higher followability and excellent expansion ability, and therefore, even when the object to which the mortar composition in accordance with this invention has been bonded cracks due to an earthquake or deterioration with age, the mortar composition attached to the object, is less susceptible to cracking, thus provides superior safety.

In addition, according to the mixing ratio shown in Examples 1 to 3, the greater part of the materials (about 99.8% in each Example) are inorganic materials, and therefore, the production cost is low and durability is high.

INDUSTRIAL APPLICATION

As is evident from the above description, the mortar composition in accordance with this invention has adequate bonding strength from the viewpoint of earthquake resistance, and also has high followability, providing less susceptibility to peeling and cracking.

Further, since the proportion of inorganic materials to all the materials is high compared with conventional mortar products, it highly excels in durability and working safety, and also can be provided at low cost.

The mortar composition in accordance with this invention may be used for many applications other than conventional applications, such as floor material and concrete finishing material. For example, due to the high bonding strength, the mortar composition can be used for repairing concrete walls without auxiliary tools such as wire-netting. Further, by adjusting the flow value, it can be used for applications that require flowability, such as spraying material and filling material.

We claim:

1. A method of preparing a mortar composition, comprising:
   mixing mortar materials comprising at least 25 to 45 parts by weight of a high-early-strength portland cement, 40 to 60 parts by weight of sand, 0.05 to 0.12 parts by weight of methoxy (polyethlyene glycol) methacrylate copolymer which is a polycarboxylic acid-based powdered water reducing agent, 10 to 25 parts by weight of water, and none or at least one member selected from the group consisting of: 0.05 to 1.0 parts by weight of a water retentive agent, 0.5 to 2.0 parts by weight of a carbon-based powder, 0.1 to 0.3 parts by weight of an anti-foaming agent and 0.2 to 1.0 parts by weight of a gypsum; and no organic adhesives.

2. The method of preparing a mortar composition according to claim 1, characterized in that, the water retentive agent is a methylcellulose.

3. A powdered mortar material mixture, comprising: 25 to 45 parts by weight of high-early-strength portland cement, 40 to 60 parts by weight of sand, 0.05 to 0.12 parts by weight of methoxy (polyethlyene glycol) methacrylate copolymer which is a polycarboxylic acid-based powdered water reducing agent, and none or at least one member selected from the group consisting of: 0.05 to 1.0 parts by weight of a water retentive agent, 0.5 to 2.0 parts by weight of a carbon-based powder, 0.1 to 0.3 parts by weight of an anti-foaming agent and 0.2 to 1.0 parts by weight of a gypsum; and no organic adhesives.

4. The powdered mortar material mixture according to claim 3, characterized in that the water retentive agent is a methylcellulose.

5. A mortar composition paste prepared by mixing mortar materials comprising: at least 25 to 45 parts by weight of a high-early-strength portland cement, 40 to 60 parts by weight of sand, 0.05 to 0.12 parts by weight of methoxy (polyethlyene glycol) methacrylate copolymer which is a polycarboxylic acid-based powdered water reducing agent, and 10 to 25 parts by weight of water, and none or at least one member selected from the group consisting of: 0.05 to 1.0 parts by weight of a water retentive agent, 0.5 to 2.0 parts by weight of a carbon-based powder, 0.1 to 0.3 parts by weight of an anti-foaming agent and 0.2 to 1.0 parts by weight of a gypsum; and no organic adhesives.

6. The mortar composition paste according to claim 5, wherein said methoxy (polyethlyene glycol) methacrylate copolymer which is a polycarboxylic acid-based powdered water reducing agent is mixed to cause an agitating load of a mixture of the mortar materials to vary through an increase period and three decrease periods,
   in the increase period, the agitating load rapidly increases from an initial value to a peak value,
   in the first decrease period, the agitating load rapidly decreases from the peak value to a first intermediate value,
   in the second decrease period, the agitating load slowly decreases from the first intermediate value to a second intermediate value, and
   in the third decrease period, the agitating load rapidly decreases from the second intermediate value to a stabilized value,
   wherein the methoxy (polyethlyene glycol) methacrylate copolymer which is a polycarboxylic acid-based powdered water reducing agent is mixed with 25 to 45 parts by weight of a high-early-strength portland cement and 40 to 60 parts by weight of sand alone having a total weight of 25 kg, the mixture is poured into a barrel having a capacity of 75 liters already filled with 10 to 25 parts by weight of water alone, the barrel being provided with an motor driven agitator rotating a linear blade plate extending radially along the bottom of the barrel as agitating means and,
   wherein a total decrease in the third decrease period is 10% or more of a total increase in the increase period, where the motor driven agitator has a rating of 100 V, 8.5 A, 560 rpm, 50-60 Hz.

7. The mortar composition paste according to claim 6, wherein the peak value is 3.75 A or more, measured in load current, and is reached within 1 minute from a beginning of pouring the mixture into the barrel provided with the agitator at work, where the motor driven agitator has a rating of 100 V, 8.5 A, 560 rpm, 50-60 Hz.

8. The mortar composition paste according to claim 6, wherein the total decrease from the peak value to a value measured at 10 minutes from a beginning of pouring the mixture into the barrel is 45% or more of a total increase in the increase period, where the motor driven agitator has a rating of 100 V, 8.5 A, 560 rpm, 50-60 Hz.

9. The method of preparing a functional mortar composition, comprising:
   preparing a powdered mortar material mixture comprising 25 to 45 parts by weight of high-early-strength portland cement, 40 to 60 parts by weight of sand, 0.05 to 0.12 parts by weight of methoxy (polyethlyene glycol) methacrylate copolymer which is a polycarboxylic acid-based powdered water reducing agent, functional powders including iron powder or rubber powder, and none or at least one member selected from the group consisting of: 0.05 to 1.0 parts by weight of a water retentive agent, 0.5 to 2.0 parts by weight of a carbon-based powder, 0.1 to 0.3 parts by weight of an anti-foaming agent and 0.2 to 1.0 parts by weight of a gypsum; and no organic adhesives.

10. The method of preparing a functional mortar composition according to claim 9, wherein said methoxy (polyethlyene glycol) methacrylate copolymer which is a polycarboxylic acid-based powdered water reducing agent is mixed to cause an agitating load of a mixture of mortar materials to vary through an increase period and three decrease periods,
   in the increase period, the agitating load rapidly increases from an initial value to a peak value,
   in the first decrease period, the agitating load rapidly decreases from the peak value to a first intermediate value,
   in the second decrease period, the agitating load slowly decreases from the first intermediate value to a second intermediate value, and in the third decrease period, the agitating load rapidly decreases from the second intermediate value to a stabilized value, wherein the methoxy (polyethlyene glycol) methacrylate copolymer which is a polycarboxylic acid-based powdered water reducing agent is mixed with 25 to 45 parts by weight of a high-early-strength portland cement, 40 to 60 parts by weight of sand alone having a total weight of 25 kg, and functional powder, the mixture is poured into a barrel having a capacity of 75 liters already filled with 10 to 25 parts by weight of water alone, the barrel being provided with a motor driven agitator rotating a linear blade plate extending radially along the bottom of the barrel as agitating means and, wherein a total decrease in the third decrease period is 10% or more of a total increase in the increase period, where the motor driven agitator has a rating of 100 V, 8.5 A, 560 rpm, 50-60 Hz.

11. The method of preparing a functional mortar composition according to claim 10, wherein the peak value is 3.75 A or more, measured in load current, and is reached within 1 minute from a beginning of pouring the mixture into the barrel, where the motor driven agitator has a rating of 100 V, 8.5 A, 560 rpm, 50-60 Hz.

12. The mortar composition according to claim 10, wherein the total decrease from the peak value to a value measured at 10 minutes from a beginning of pouring the mixture into the barrel is 45% or more of a total increase in the increase period, where the motor driven agitator has a rating of 100 V, 8.5 A, 560 rpm, 50-60 Hz.

13. A method of preparing a mortar composition according to claim 1, wherein said methoxy (polyethlyene glycol) methacrylate copolymer which is a polycarboxylic acid-based powdered water reducing agent is mixed to cause an agitating load characteristic in a mixing test, the mixing test comprising steps of, preparing a mixture of 25 to 45 parts by weight of a high-early-strength portland cement, 40 to 60 parts by weight of sand, 0.05 to 0.12 parts by weight of polycarboxylic acid-based powdered water reducing agent of methoxy (polyethylene glycol) methacrylate copolymer having a total weight of 25 kg, preparing a barrel having a capacity of 75 liters already filled with 10 to 25 parts by weight of water alone, the barrel being provided with an motor driven agitator rotating a linear blade plate extending radially along the bottom of the barrel as agitating means, and observing the agitating load through a load current of the motor while operating the motor driven agitator after pouring the mixture into the barrel, said agitating load characteristics being characterized in that the agitating load becomes stable after passing through one increase period and three decrease periods in tern after pouring the mixture into the barrel, wherein, in the increase period, the agitating load rapidly increases from an initial value to a peak value, in a first decrease period, the agitating load rapidly decreases from the peak value to a first intermediate value, in a second decrease period, the agitating load slowly decreases from the first intermediate value to a second intermediate value, and in a third decrease period, the agitating load rapidly decreases from the second intermediate value to a stabilized value.

14. The method of preparing a mortar composition according to claim 13, wherein a total decrease in the third decrease period is 10% or more of a total increase in the increase period, where the motor driven agitator has a rating of 100 V, 8.5 A, 560 rpm, 50-60 Hz.

15. The method of preparing a mortar composition according to claim 13, wherein the peak value is 3.75 A or more, measured in load current, and is reached within 1 minute from the beginning of pouring the mixture into the barrel, where the motor driven agitator has a rating of 100 V, 8.5 A, 560 rpm, 50-60 Hz.

16. The method of preparing a mortar composition according to claim 13, wherein the total decrease from the peak value to a value measured at 10 minutes from the beginning of pouring the mixture into the barrel is 45% or more of a total increase in the increase period, where the motor driven agitator has a rating of 100 V, 8.5 A, 560 rpm, 50-60 Hz.

* * * * *